(12) United States Patent
Cardozo

(10) Patent No.: US 8,727,266 B2
(45) Date of Patent: May 20, 2014

(54) FLYING MACHINE COMPRISING TWIN CONTRA-ROTATING VERTICAL AXIS PROPELLERS

(75) Inventor: Giles Cardozo, Mere (GB)

(73) Assignee: Gilo Industries Limited, Mere, Wiltshire (GB)

( * ) Notice: Subject to any disclaimer, the term of this patent is extended or adjusted under 35 U.S.C. 154(b) by 465 days.

(21) Appl. No.: 12/994,733

(22) PCT Filed: Jun. 1, 2009

(86) PCT No.: PCT/GB2009/001362
§ 371 (c)(1),
(2), (4) Date: Feb. 15, 2011

(87) PCT Pub. No.: WO2009/144477
PCT Pub. Date: Dec. 3, 2009

(65) Prior Publication Data
US 2011/0163199 A1 Jul. 7, 2011

(30) Foreign Application Priority Data
May 30, 2008 (GB) .................................. 0809797.4

(51) Int. Cl.
*B64C 29/00* (2006.01)
*B64C 27/10* (2006.01)

(52) U.S. Cl.
USPC ....................................................... 244/23 C

(58) Field of Classification Search
USPC .......... 244/17.13, 17.23, 17.25, 23 C, 67, 69, 244/79
See application file for complete search history.

(56) References Cited

U.S. PATENT DOCUMENTS

| | | | |
|---|---|---|---|
| 2,847,173 A | 8/1958 | McCarty, Jr. | |
| 2,863,621 A | 12/1958 | Davis | |
| 2,952,422 A | 9/1960 | Fletcher et al. | |

(Continued)

FOREIGN PATENT DOCUMENTS

| | | |
|---|---|---|
| CN | 2207997 Y | 9/1995 |
| CN | 2789131 Y | 6/2006 |

(Continued)

OTHER PUBLICATIONS

International Search Report and Written Opinion of the International Searching Authority, mailed Jan. 18, 2010, for corresponding International Application No. PCT/GB2009/001362, 19 pages.

(Continued)

*Primary Examiner* — Timothy D Collins
*Assistant Examiner* — Brian M O'Hara
(74) *Attorney, Agent, or Firm* — Klarquist Sparkman, LLP

(57) ABSTRACT

A flying machine comprises a chassis on the underside of which is mounted two vertical axis contra-rotating propellers, which share a common rotational axis. The propellers are driven by two motors through a common drive mechanism, the motors being mounted on the chassis above the propellers and being longitudinally spaced apart along the chassis. Handlebars are movably mounted on the chassis between a seat and a nose piece. A user of the machine thus sits substantially centrally on top of the propellers with their legs straddling the motors and drive mechanism, the riding position thus being closely similar to that of a motorbike. Various collective and cyclic blade pitch control mechanisms are also disclosed. The handlebars and seat in some embodiments are replaced by a load carrying region.

18 Claims, 21 Drawing Sheets

(56) References Cited

U.S. PATENT DOCUMENTS

| | | | |
|---|---|---|---|
| 2,953,321 A | 9/1960 | Robertson et al. | |
| 3,395,876 A | 8/1968 | Green | |
| 4,123,018 A | 10/1978 | Tassin de Montaigu | |
| 5,150,857 A | 9/1992 | Moffitt et al. | |
| 5,295,643 A | 3/1994 | Ebbert et al. | |
| 5,575,438 A | 11/1996 | McGonigle et al. | |
| 6,270,038 B1 | 8/2001 | Cycon et al. | |
| 6,845,939 B1 | 1/2005 | Baldwin | |
| 7,581,608 B2* | 9/2009 | St. Louis | 180/116 |
| 7,789,341 B2* | 9/2010 | Arlton et al. | 244/17.23 |
| 7,967,239 B2 | 6/2011 | Cotton et al. | |
| 8,469,307 B2 | 6/2013 | Arlton et al. | |
| 2003/0122033 A1 | 7/2003 | Gao | |
| 2003/0136875 A1 | 7/2003 | Pauchard | |
| 2005/0127239 A1 | 6/2005 | Srivastava | |
| 2006/0011777 A1* | 1/2006 | Arlton et al. | 244/7 B |
| 2006/0049304 A1 | 3/2006 | Sanders, Jr. et al. | |
| 2006/0208133 A1 | 9/2006 | Ligo | |
| 2007/0017722 A1* | 1/2007 | St. Louis | 180/116 |

FOREIGN PATENT DOCUMENTS

| | | |
|---|---|---|
| CN | 2790824 Y | 6/2006 |
| DE | 19842543 A1 | 5/1999 |
| EP | 1298054 A2 | 4/2003 |
| GB | 568548 | 4/1945 |
| JP | H01101297 A | 4/1989 |
| JP | 1-114591 | 5/1989 |
| JP | H06293296 A | 10/1994 |
| JP | H06509770 A | 11/1994 |
| JP | H11342899 A | 12/1999 |
| JP | 2000006895 A | 1/2000 |
| JP | 2002542116 A | 12/2002 |
| JP | 2007091187 A | 4/2004 |
| JP | 2004306668 A | 11/2004 |
| JP | 2005297938 A | 10/2005 |
| JP | 2005319970 A | 11/2005 |
| JP | 2006130993 A | 5/2006 |
| JP | 2007508998 A | 4/2007 |
| JP | 2007535438 A | 12/2007 |
| JP | 2008062909 A | 3/2008 |
| JP | 2008094277 A | 4/2008 |
| JP | 2008545580 A | 12/2008 |
| RU | 2133210 | 7/1999 |
| RU | 24988 U1 | 9/2002 |
| WO | WO 93/03961 | 3/1993 |
| WO | WO 95/30575 | 11/1995 |
| WO | WO 97/36781 | 10/1997 |
| WO | WO97/36781 A1 | 10/1997 |
| WO | WO 00/64736 | 11/2000 |
| WO | WO 2005/039973 A2 | 5/2005 |
| WO | WO 2005/072233 | 8/2005 |
| WO | WO2005/072233 A2 | 8/2005 |
| WO | WO 2005/099415 A2 | 10/2005 |
| WO | WO 2007/084171 A2 | 7/2007 |

OTHER PUBLICATIONS

International Preliminary Report on Patentability and Written Opinion of the International Searching Authority, mailed Nov. 30, 2010, for corresponding International Application No. PCT/GB2009/001362, 12 pages.

Search Report from the United Kingdom Intellectual Property Office for corresponding Great Britain Application No. GB0809797.4, Sep. 19, 2008, 2 pages.

Search Report from the United Kingdom Intellectual Property Office for corresponding Great Britain Application No. GB1021195.1, Feb. 22, 2012, 5 pages.

English translation of Japanese Office action dated Aug. 20, 2013, issued in Japanese Patent Application No. 2011-511091.

English translation of Russian Office action dated Jun. 5, 2013, issued in Russian Patent Application No. 2010154165.

* cited by examiner

FLYING MACHINE COMPRISING TWIN CONTRA-ROTATING VERTICAL AXIS PROPELLERS

CROSS REFERENCE TO RELATED APPLICATIONS

This is the U.S. National Stage of International Application No. PCT/GB2009/001362, filed Jun. 1, 2009, which in turn claims the benefit of and priority to Great Britain Application No. 0809797.4, filed May 30, 2008.

The present invention relates to a flying machine comprising twin contra-rotating vertical axis propellers positioned below a load to be carried.

It has been proposed to provide a flying machine comprising a flying platform in which a user stands on a platform underneath which is mounted a propeller to generate lift to raise the platform from the ground. The platform comprises a peripheral hand rail which the user grips, the user adjusting his weight to control the inclination and thus direction of travel of the platform. Such a flying platform is proposed in U.S. Pat. No. 2,953,321 of Arthur Robertson et al. Such a platform was also proposed by a Charles Zimmerman in the 1940's and 1950's.

Whilst the basic principle of the flying platform was established with such early proposals, a commercially practical and more readily controllable version was never realised.

The current application therefore stems from some work involved in solving the real-world impracticalities and problems of the very basic flying platforms previously proposed.

According to a first aspect of the invention there is provided a flying machine comprising at least one motor and two vertical axis contra-rotating propellers the blades of which are arranged to generate lift on rotation of the propellers by the motor, the machine being provided with a seat and handlebars both mounted on the machine above the propellers at positions radially inward of the outer periphery of the propellers.

Preferably the propellers are arranged such that a characteristic of the propellers can be varied to account for any difference in air flow into each propeller such that in use each propeller produces substantially the same lift.

Preferably it is the pitch of the propeller blades that can be varied.

Preferably the machine comprises two motors.

Preferably the two motors are connected to a single drive means operative to transfer the output drive from the motors to the propellers.

Preferably the motors are each connected to the drive means via a respective one way clutch operative to enable one motor to drive the drive means without the other motor.

Preferably the handlebars are laterally spaced in one direction from the rotational axis of the propellers, the seat being laterally spaced in an opposite direction from the rotational axis of the propellers.

Preferably movement of at least part of the handlebars is operative to control the yaw of the machine.

Preferably rotation of the handlebars relative to the machine controls the yaw of the machine.

In one embodiment the machine comprises a tail rotor, the handlebars being operative to control the tail rotor to control the yaw of the machine.

Preferably the handlebars are operative to control the rotational speed of the tail rotor.

In another embodiment, the handlebars are operative to vary a characteristic of the contra-rotating propellers to induce a torque reaction to cause the machine to yaw.

Preferably the handlebars control the difference between the collective pitch of the blades of each contra-rotating propeller in order to induce the torque reaction.

Preferably the handlebars control the collective pitch of the blades of only one propeller to control the yaw of the machine.

The handlebars may alternatively or additionally control the relative rotational speed of the propellers to control the yaw of the machine.

Preferably the machine comprises at least one throttle lever, movement of which controls the speed of the motor(s).

Preferably the handlebars comprise a twist grip, rotation of which controls the collective pitch of the blades of at least one propeller so as to control the lift produced.

Preferably the machine comprises a collective pitch mechanism operative to vary the collective pitch of the blades of the propellers, the mechanism comprising a swash plate linked to the propeller blades, movement of the swash plate relative to the propeller blades rotating the propeller blades about their longitudinal axes to vary the pitch of the propeller blades.

Preferably the swash plate is arranged to move linearly in a direction parallel with the axis of rotation of the propellers, this linear motion being converted into rotary motion of the blades by virtue of linkages linking the swash plate to the blades.

Preferably each propeller is associated with a respective swash plate.

In one embodiment there is a transfer swash plate to transfer movement of one swash plate to the other swash plate.

Preferably an actuator is provided to effect movement of one swash plate, movement of said swash plate being transferred to the other swash plate by the transfer swash plate such that the collective pitch of the blades of both propellers is controlled simultaneously by one actuator.

In another embodiment, movement of each swash plate is controlled by a respective actuator such that the collective pitch of the blades of one propeller can be controlled independently of the collective pitch of the blades of the other propeller.

Preferably the propellers are surrounded by a peripheral skirt.

Preferably the skirt comprises a plurality of vertically spaced apart rings, the gaps between the rings functioning as ducts to supply air to the propellers, in use.

Preferably the rings are of aerofoil shaped transverse cross section.

Preferably the base of the machine comprises a plurality of runners on which the machine rests when not in flight.

Preferably the base of the machine comprises a centrally mounted hub that facilitates movement of the machine when not in flight.

Preferably the hub comprises a ball rotatably mounted in a socket in the base of the machine.

According to a second aspect of the invention there is provided a flying machine comprising at least one motor and two vertical axis contra rotating propellers the blades of which are arranged to generate lift on rotation of the propellers by the motor, handlebars being movably mounted on the machine above the propellers, movement of the handlebars relative to the machine effecting, in use, yaw control of the machine.

Preferably rotation of the handlebars relative to the machine chassis effects, in use, yaw control of the machine.

In one embodiment the machine comprises a tail rotor, the handlebars being operative to control the tail rotor to control the yaw of the machine.

Preferably the handlebars are operative to control the rotational speed of the tail rotor.

In another embodiment, the handlebars are operative to vary a characteristic of the contra-rotating propellers to induce a torque reaction to cause the machine to yaw.

Preferably the handlebars vary the difference between the collective pitch of the blades of each contra-rotating propeller in order to induce the torque reaction.

Preferably the handlebars control the collective pitch of the blades of only one propeller to control the yaw of the machine.

The handlebars may alternatively or additionally control the relative rotational speed of the propellers to control the yaw of the machine.

Preferably the handlebars comprise a twist grip, rotation of which controls the collective pitch of the blades of at least one propeller so as to control the lift produced.

Preferably the machine comprises a collective pitch mechanism operative to vary the collective pitch of the blades of the propellers, the mechanism comprising a swash plate linked to the propeller blades, movement of the swash plate relative to the propeller blades rotating the propeller blades about their longitudinal axes to vary the pitch of the propeller blades.

Preferably the swash plate is arranged to move linearly in a direction parallel with the axis of rotation of the propellers, this linear motion being converted into rotary motion of the blades by virtue of linkages linking the swash plate to the blades.

Preferably each propeller is associated with a respective swash plate.

In one embodiment there is a transfer swash plate to transfer movement of one swash plate to the other swash plate.

Preferably an actuator is provided to effect movement of one swash plate, movement of said swash plate being transferred to the other swash plate by the transfer swash plate such that the collective pitch of the blades of both propellers is controlled simultaneously by one actuator.

In another embodiment, movement of each swash plate is controlled by a respective actuator such that the collective pitch of the blades of one propeller can be controlled independently of the collective pitch of the blades of the other propeller.

According to a third aspect of the invention there is provided a flying machine comprising at least one motor and two vertical axis contra-rotating propellers the blades of which are arranged to generate lift on rotation of the propellers by the motor, handlebars being mounted on the machine above the propellers, the machine further comprising a collective pitch mechanism operative to collectively control the pitch of the propeller blades, the collective pitch mechanism being controlled at the handlebars.

Preferably the handlebars comprise a twist grip, rotation of which controls the collective pitch of the blades of at least one propeller so as to control the lift produced.

Preferably the collective pitch mechanism comprises a swash plate linked to the propeller blades, movement of the swash plate relative to the propeller blades rotating the propeller blades about their longitudinal axes to vary the pitch of the propeller blades.

Preferably the swash plate is arranged to move linearly in a direction parallel with the axis of rotation of the propeller(s), this linear motion being converted into rotary motion of the blades by virtue of linkages linking the swash plate to the blades.

Preferably each propeller is associated with a respective swash plate.

In one embodiment there is a transfer swash plate to transfer movement of one swash plate to the other swash plate.

Preferably an actuator is provided to effect movement of one swash plate, movement of said swash plate being transferred to the other swash plate by the transfer swash plate such that the collective pitch of the blades of both propellers is controlled simultaneously by one actuator.

In another embodiment, movement of each swash plate is controlled by a respective actuator such that the collective pitch of the blades of one propeller can be controlled independently of the collective pitch of the blades of the other propeller.

According to a fourth aspect of the invention there is provided a flying machine comprising at least one motor and two vertical axis contra-rotating propellers the blades of which are arranged to generate lift on rotation of the propellers by the motor, the machine comprising a yaw control mechanism operative to vary a characteristic of at least one propeller relative to the other in order to induce a torque reaction operative to cause the machine to yaw.

Preferably the yaw control mechanism controls the difference between the collective pitch of the blades of each contra-rotating propeller in order to induce the torque reaction.

Preferably the yaw control mechanism controls the collective pitch of only one propeller to control the yaw of the machine.

The yaw control mechanism may alternatively or additionally control the relative rotational speed of the propellers to control the yaw of the machine.

Preferably the yaw control mechanism comprises a collective pitch mechanism operative to vary the collective pitch of the blades of the propellers, the mechanism comprising a swash plate linked to the propeller blades, movement of the swash plate relative to the propeller blades rotating the propeller blades about their longitudinal axes to vary the pitch of the propeller blades.

Preferably the swash plate is arranged to move linearly in a direction parallel with the axis of rotation of the propellers, this linear motion being converted into rotary motion of the blades by virtue of the linkages linking the swash plate to the blades.

Preferably each propeller is associated with a respective swash plate.

Preferably movement of each swash plate is controlled by a respective actuator such that the collective pitch of the blades of one propeller can be controlled independently of the collective pitch of the blades of the other propeller.

According to a fifth aspect of the invention there is provided a flying machine comprising at least one motor and two vertical axis contra-rotating propellers the blades of which are arranged to generate lift on rotation of the propellers by the motor, the machine being provided with a seat and handlebars above the propellers and a hub that projects below the propellers and below the lowermost part of the machine, the hub partially supporting the machine in an inclined orientation when at rest, the user being able to control the machine during take off such that the machine is partially supported by the hub and partially supported by the lift generated by the propellers, with the machine in a non-inclined orientation.

According to a sixth aspect of the invention there is provided a flying machine comprising at least one motor and two vertical axis contra-rotating propellers the blades of which are arranged to generate lift on rotation of the propellers by the motor, a load carrying region being provided above the propellers, the propellers each being provided with a respective blade pitch control mechanism, the machine further comprising a controller, the blade pitch control mechanisms and controller being arranged such that the pitch of the blades of one propeller are independently controllable from the pitch of the blades of the other propeller.

Preferably the blade pitch control mechanisms and controller are arranged such that each of the collective and cyclic pitch of the blades of one propeller are independently controllable from each of the collective and cyclic pitch of the blades of the other propeller.

Preferably at least one of the blade pitch control mechanisms is actuated by a servo controlled by the controller.

Most preferably each blade pitch control mechanism is controlled by a respective servo.

Preferably each blade pitch control mechanism is provided by it's own set of servos, a servo being provided for each propeller blade.

Preferably each propeller is driven by a respective drive shaft, the drive shafts being coaxial, at least one of the drive shafts being hollow such that at least one of the blade pitch control mechanisms is contained within that drive shaft.

According to a seventh aspect of the invention there is provided a flying machine comprising at least one motor and two vertical axis contra-rotating propellers the blades of which are arranged to generate lift on rotation of the propellers by the motor, a load carrying container being mounted above the propellers.

Preferably the load carrying container is elongate and is arranged to extend along the longitudinal axis of the machine, the width of the container being less than the width of the machine.

The load carrying container may comprise a stretcher for carrying an injured person.

A pusher fan assembly may be provided comprising a rearwardly directed impeller mounted for rotation about an axis perpendicular to the axis of rotation of the vertical axis propellers, and arranged to generate additional thrust when the rearwardly directed impeller is in use.

At least one movably mounted aerofoil may be provided, the angle of inclination of which can be adjusted relative to the machine.

Preferably the movably mounted aerofoil is mounted for rotation about a horizontal axis extending transversely across the machine.

Preferably a plurality of movably aerofoils are provided.

Preferably a first set of movable aerofoils is provided at the front of the machine and a second set at the rear of the machine.

According to an eighth aspect of the invention there is provided a flying machine comprising at least one motor and two vertical axis contra-rotating propellers the blades of which are arranged to generate lift on rotation of the propellers by the motor, a load carrying region being provided above the propellers, a controller being provided comprising a plurality of gyros arranged to generate signals indicative of the attitude of the machine, the controller being operative to process the signals and to subsequently control the machine to maintain the machine in a predetermined attitude.

Other aspects of the present invention may include any combination of the features or limitations referred to herein.

The present invention may be carried into practice in various ways, but embodiments will now be described by way of example only with reference to the accompanying drawings in which.

Figure 1:
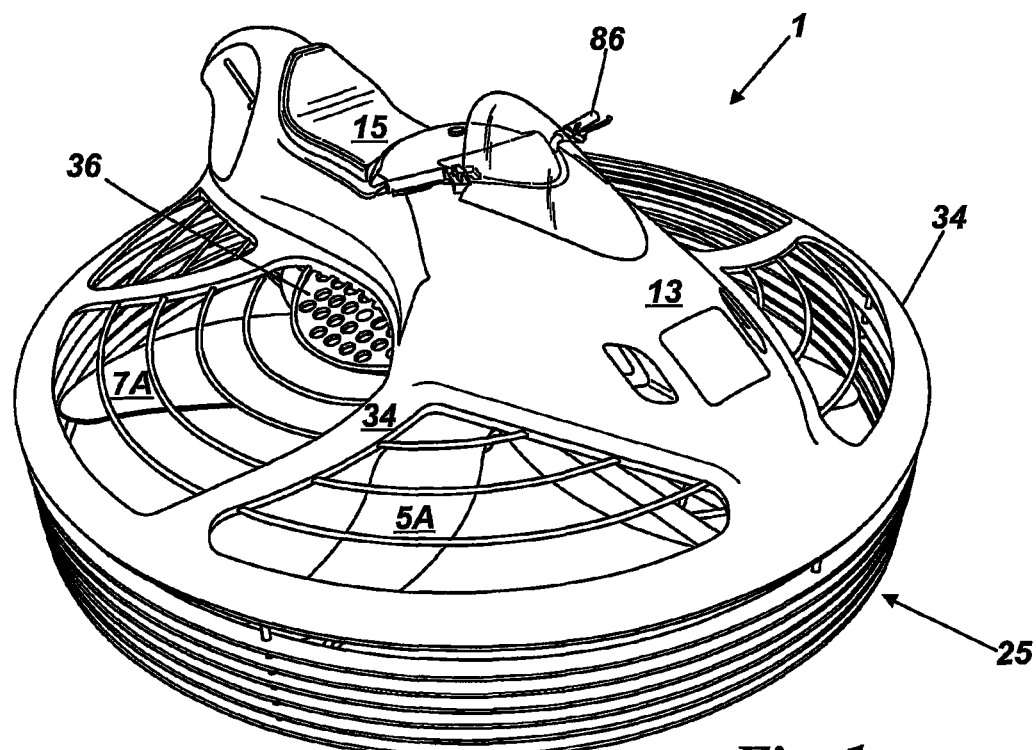
FIG. 1 is a perspective view from the front of a flying machine in accordance with the present invention.
Figure 2:
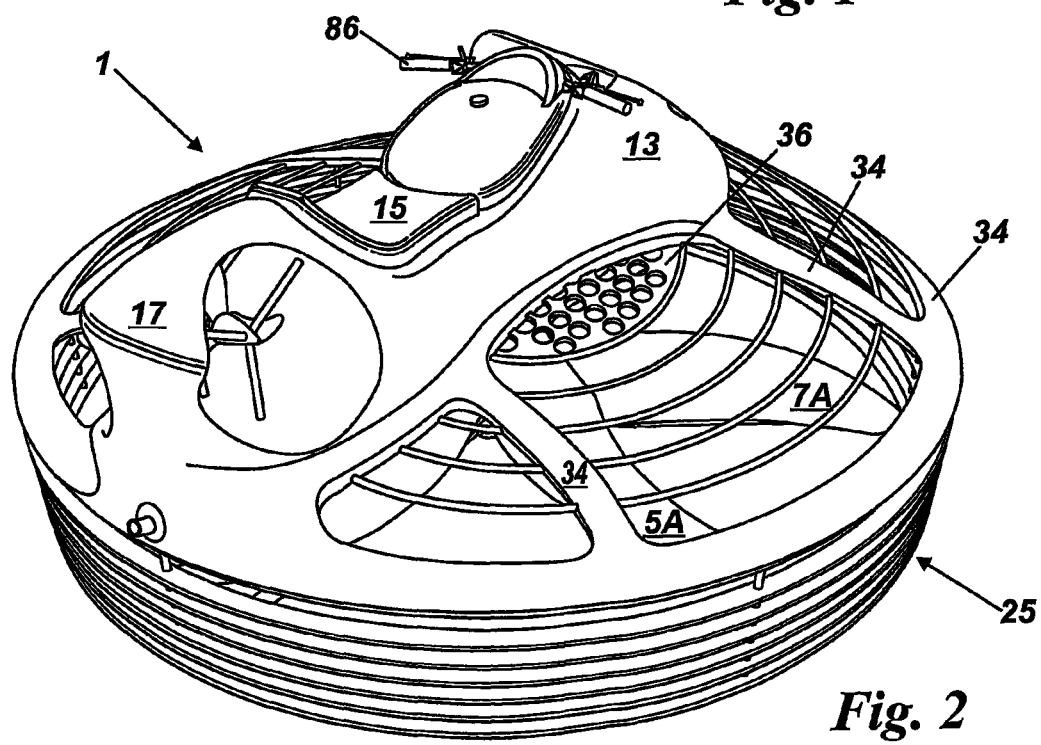
FIG. 2 is a perspective view from the rear of the flying machine of FIG. 1.
Figure 3:
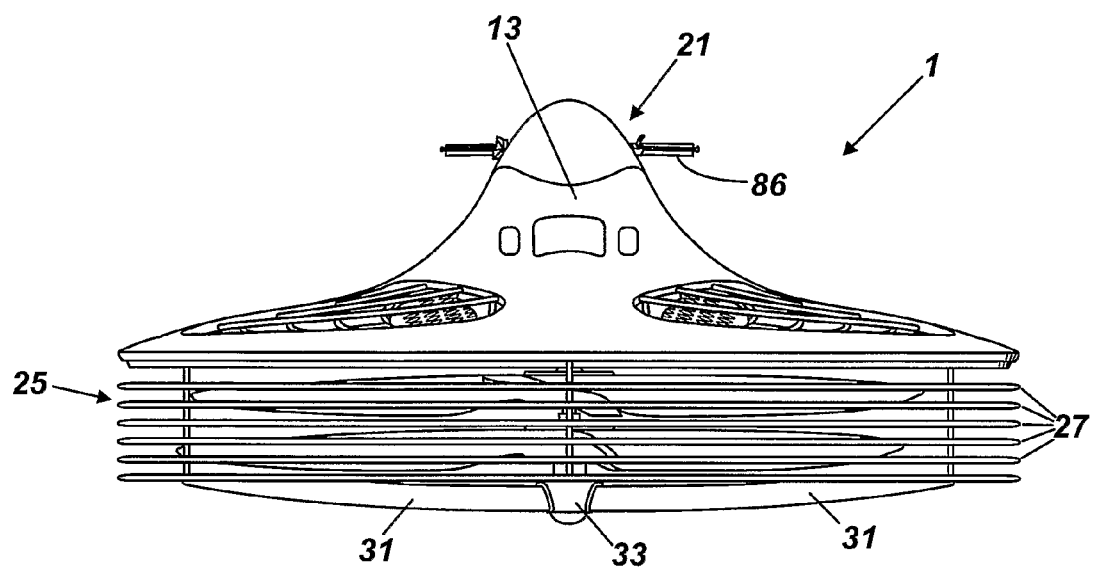
FIG. 3 is a view from the front of the flying machine of FIGS. 1 and 2.
Figure 4:
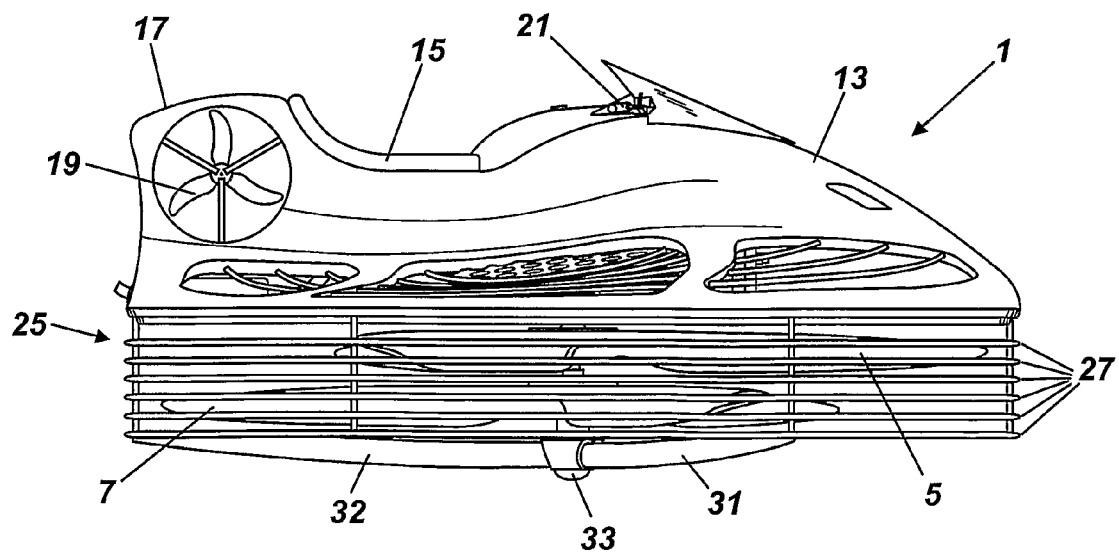
FIG. 4 is a view from the side of the flying machine of FIGS. 1 to 3.
Figure 5:
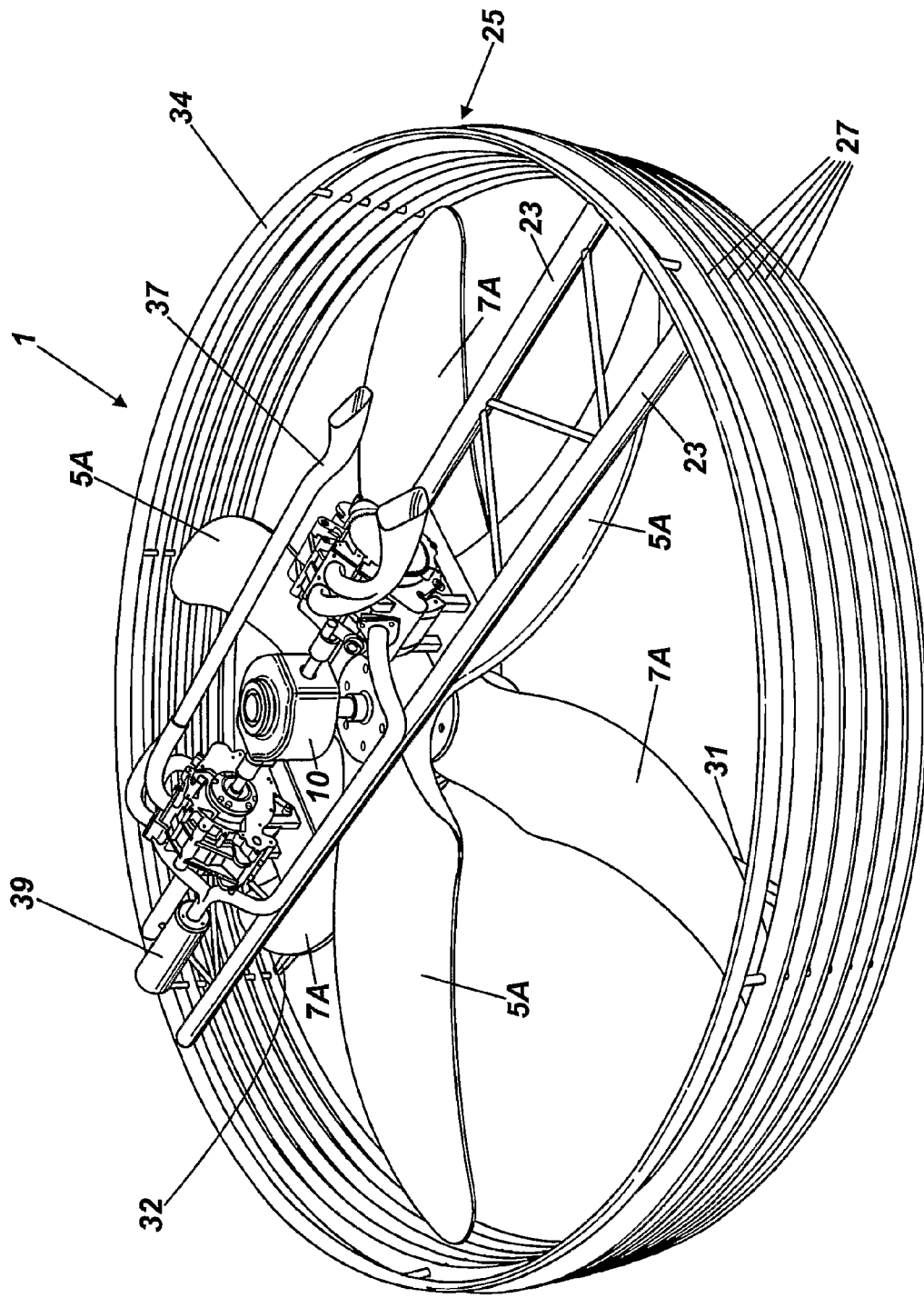
FIG. 5 is a perspective view from the top and front of the flying machine of FIGS. 1 to 4 with the bodywork and controls of the machine removed for clarity.
Figure 6:
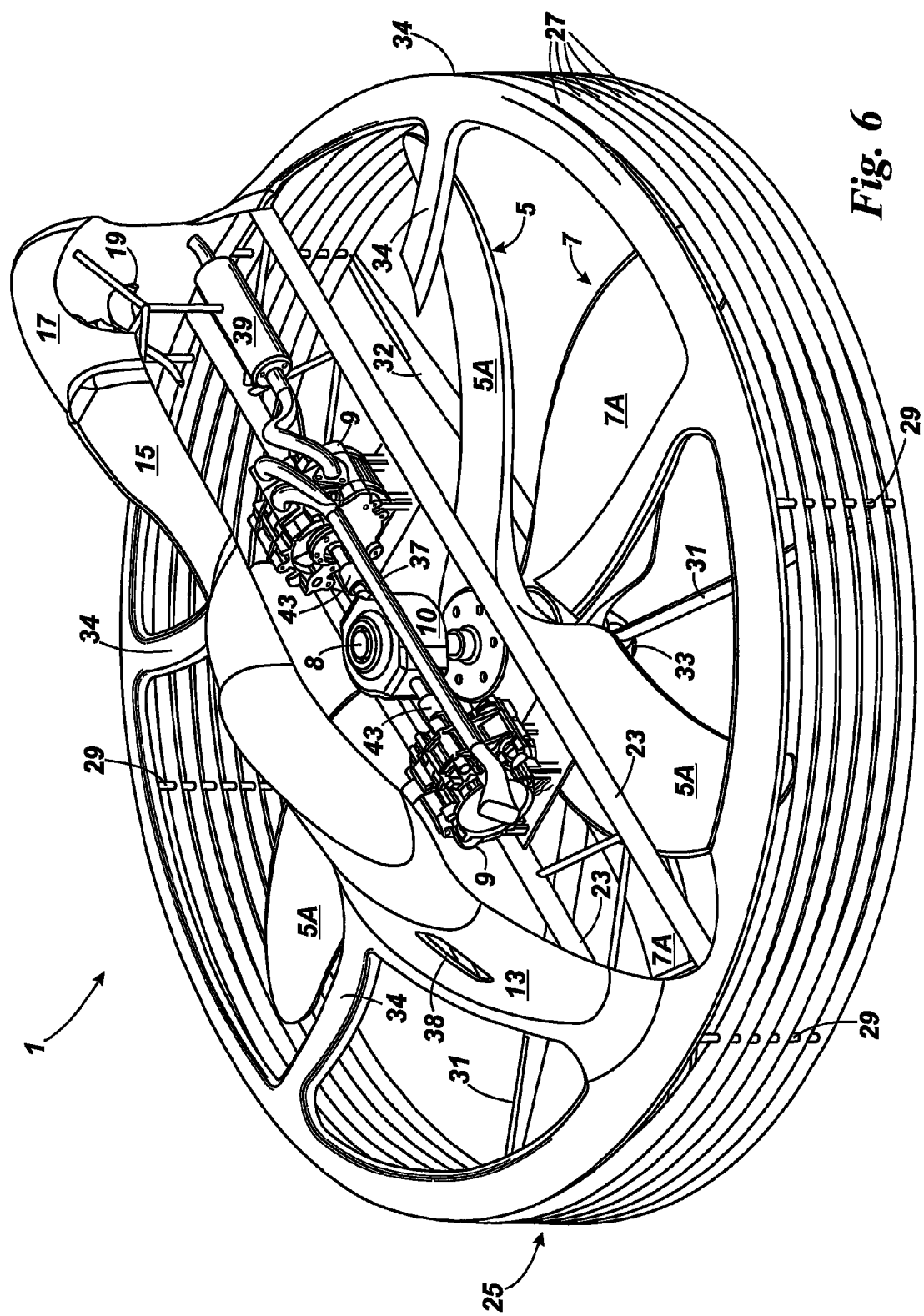
FIG. 6 is a more detailed perspective view from the front and top of the flying machine of FIGS. 1 to 5 with part of the bodywork of the machine cut away.

Referring to FIGS. 1 to 6, a flying machine 1 comprises a chassis 3 on the underside of which is mounted two vertical axis contra-rotating propellers 5, 7, which share a common rotational axis 8. The propellers 5, 7 are driven by two motors 9 through a common drive mechanism 10, the motors 9 being mounted on the chassis 3 above the propellers 5, 7 and being longitudinally spaced apart along the chassis 3. Bodywork is mounted on top of the chassis 3 above the propellers 5, 7 and comprises an aerodynamic nose piece 13, a seat 15 behind the nose piece 13, and a tail piece 17 behind the seat 15 which in this example is provided with a ducted tail rotor 19. Handlebars 21 are movably, that is rotatably in this example, mounted on the chassis 3 between the seat 15 and the nose piece 13. A user of the machine 1 thus sits substantially centrally on top of the propellers 5, 7 with their legs straddling the motors 9 and drive mechanism 10, the riding position thus being closely similar to that of a motorbike.

The chassis 3 comprises two parallel main chassis rails 23 that extend longitudinally from front to back of the machine 1. A circular skirt 25 surrounds the propellers 5, 7 and is mounted on the ends of the chassis rails 23. The skirt 25 comprises a plurality of vertically spaced rings 27 of aerofoil shaped transverse cross section. The rings 27 are held in spaced apart position by a plurality of vertical spacer struts 29 so as to define air inlet ducts between each pair of rings 27.

The base of the skirt 25 is provided with three, equispaced runners 31, 32. The two side runners 31 extend forwardly from the propeller axis 8 to the skirt 25 at an angle of about 45° from the longitudinal axis of the machine 1. The rear runner 32 extends rearwardly from the propeller axis 8 in a direction coaxial with the longitudinal axis of the machine 1.

The lowermost surface of each runner 31, 32 is curved, a central spherical hub or rotatably mounted ball 33 being provided at the intersection of the runners 31, 32 at the propeller axis 8. When resting on the ground the machine 1 is thus in an inclined orientation so as to be tilted backwards and to one side so as to rest on the ball 33, the rear runner 32 and one of the side runners 31. The machine 1 can be moved around when on the ground by lifting it off the runners 31, 32 and supporting it on the ball 33 alone.

The bodywork is also circular in plan, the periphery of the bodywork being co-marginal with the top margin 34 of the skirt 25. The nose piece 13, seat 15 and the tail section 17 form a unit extending longitudinally from front to rear of the machine 1 mounted on the top of the chassis rails 23. The seat 15 and handlebars 21 are spaced apart along the longitudinal axis of the chassis 3 and are located radially inwardly of the periphery of the propellers 5, 7. Curved spokes 34 extend radially outwardly from the main body unit to the top margin 34 of the skirt 25. Footrests 36 are provided adjacent the seat 15.

In this example, the machine 1 comprises two motors 9 longitudinally spaced apart along the chassis rails 23, one on either side of the rotational axis 8 of the propellers 5, 7. In this example each motor 9 comprises a four stroke rotary petrol engine, each engine comprising a respective air inlet duct 37 to draw air in from inlet apertures 38 formed in the nose piece 13 of the machine 1, and each comprising a respective exhaust pipe and silencer 39 that exit through the tail piece 17 of the machine 1. The speed of each motor 9 is controlled by respective throttle levers (not shown), the two levers being positioned side by side in front of the seat below the handlebars 21. These are both set to an RPM reading specific to the pilot's weight. Once set at this specific RPM the throttle levers are not used during ordinary flight.

Each motor 9 comprises a respective output shaft 41 connected to a respective sprag or other one-way clutch 43. The output shaft 44 of each sprag clutch 43 is input to the common drive mechanism 10.

The drive mechanism 10 comprises a gearbox housing 45 in which is mounted two vertical coaxial propeller shafts 47, 49, the outer shaft 47 containing the upper part of the inner shaft 49. The upper end of each propeller shaft 47, 49 is provided with a respective 45° spiral bevel gear 51, 53. The lower ends of the propeller shafts 47, 49 are connected to the upper and lower propellers 5, 7 respectively.

The bevel gears 51, 53 are vertically spaced apart and are driven by smaller bevel gears 55 mounted on the ends of the sprag clutch output shafts 44 within the gearbox housing 45. The smaller bevel gears 55 are intermediate the two bevel gears 51, 53 such that the lower bevel gear 51 is driven by rotation of the sprag clutch output shafts 44 so as to rotate the outer propeller shaft 47, and upper propeller 5, in a first direction. The upper bevel gear 53 is driven by rotation of the sprag clutch output shafts 44 so as to rotate the inner propeller shaft 49, and lower propeller 7, in a direction opposite to that of the upper propeller 5.

The motors 9 and drive mechanism 10 are thus arranged such that the propellers 5, 7 are driven to contra-rotate, this contra-rotation removing or minimising any torque reaction that would otherwise cause the machine 1 to yaw about the propeller axis 8.

The sprag clutches 43 allow one motor 9 to drive the propellers 5, 7 without the other motor 9 or with one of the motors 9 producing less torque than the other, the clutch 43 associated with the non functional, or reduced torque, motor 9 allowing rotation of the clutch output shaft 44 relative to the output shaft 41 of that motor 9.

The radially innermost end of each blade 5A of the upper propeller 5 are mounted on respective pairs of spaced apart mounting plates 51. Each pair of plates 51 is mounted on a hub 53 at the lower end of the outer propeller shaft 47 via two, radially spaced apart, ball and socket connectors 55. The connectors 55 are arranged such that the blades 5A rotate with the hub 53 about the propeller axis 8 and such that each blade 5A can also rotate about its own longitudinal axis 57, that is about an axis perpendicular to the propeller rotational axis 8 such that the pitch of the blades 5A can be varied.

Likewise, the radially inner end of each blade 7A of the lower propeller 7 are mounted on respective pairs of spaced apart mounting plates 71. Each pair of plates 71 is mounted on a hub 73 at the lower end of inner propeller shaft 49 via two, radially spaced apart, ball and socket connectors 75 arranged such that the blades 7A rotate with the hub 73 about the propeller axis 8 and such that each blade 7A can rotate about its own longitudinal axis 77, that is about an axis perpendicular to the propeller rotational axis 8 such that the pitch of the blades 7A can also be varied.

Figure 7:
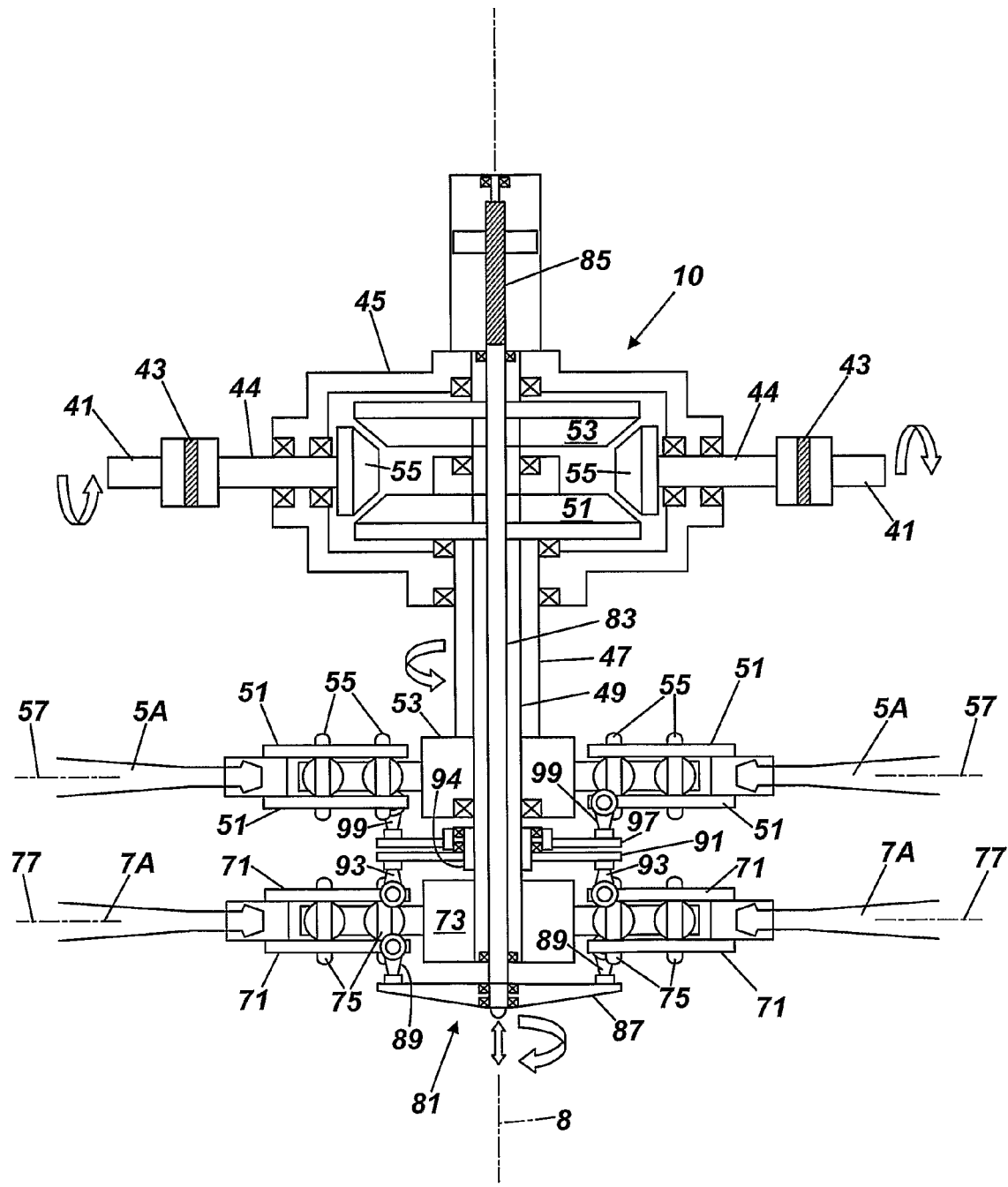
FIG. 7 is a sectional side view of a collective pitch mechanism for use with a flying machine in accordance with the present invention.
Figure 8:
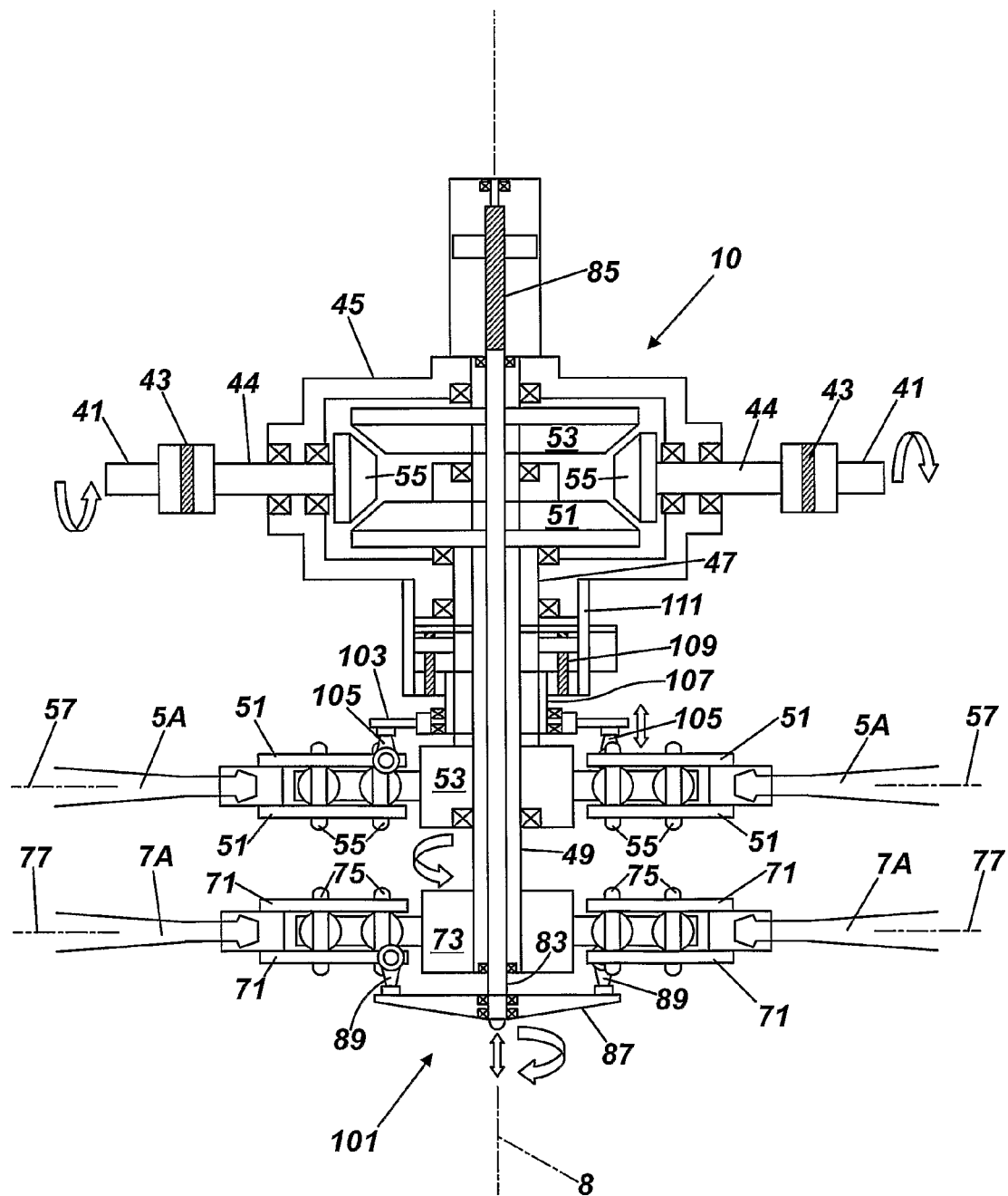
FIG. 8 is a sectional side view of another collective pitch mechanism for use with a flying machine in accordance with the present invention.
Figure 9:
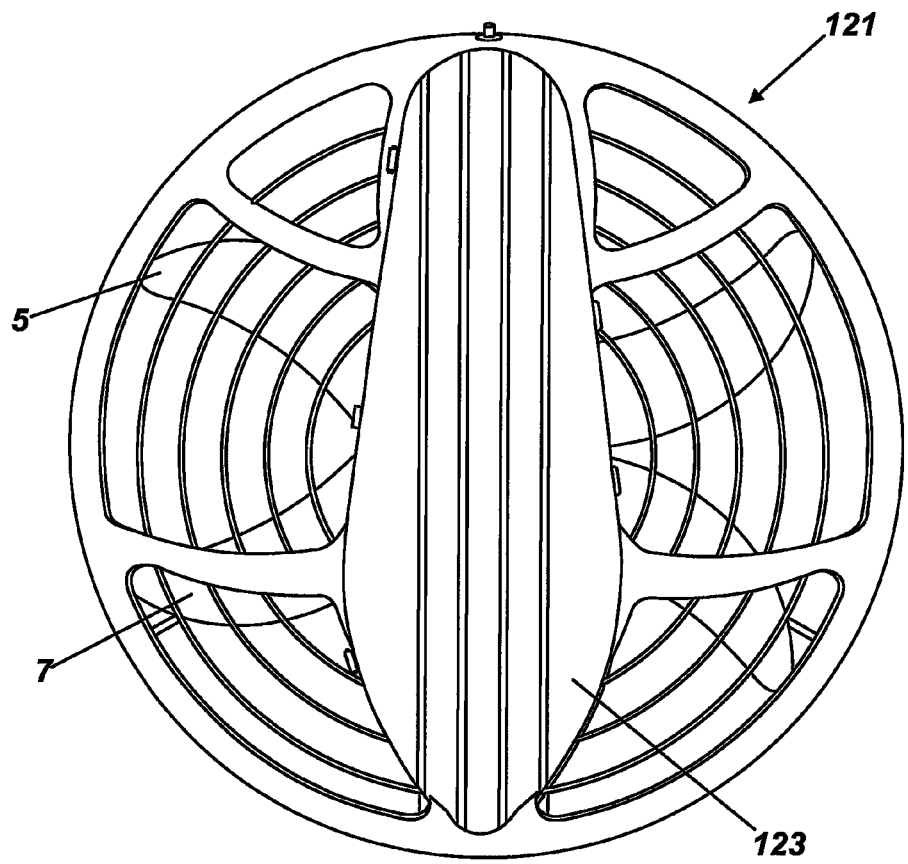
FIG. 9 is a plan view of another embodiment of a flying machine in accordance with the present invention.
Figure 10:
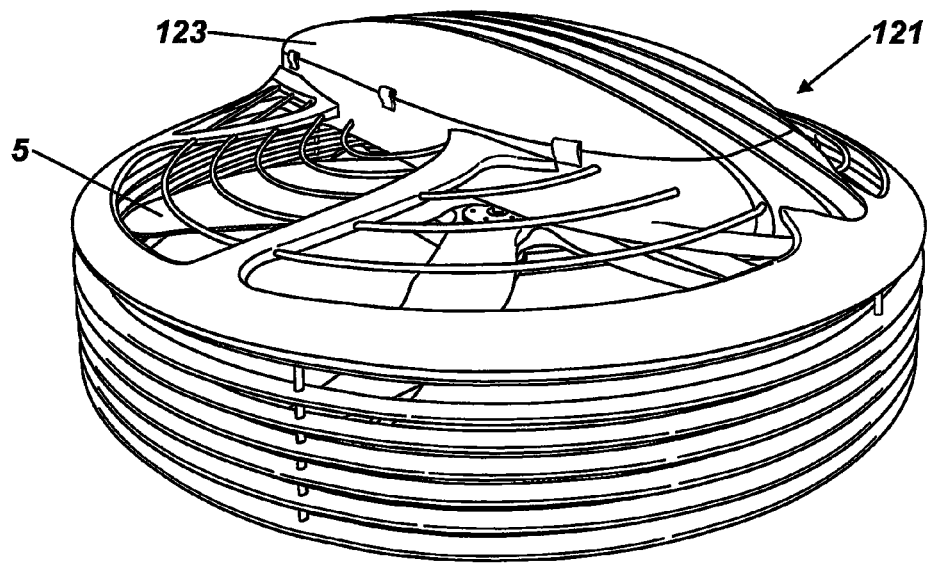
FIG. 10 is a perspective view from the front and one side of the flying machine of FIG. 10.
Figure 11:
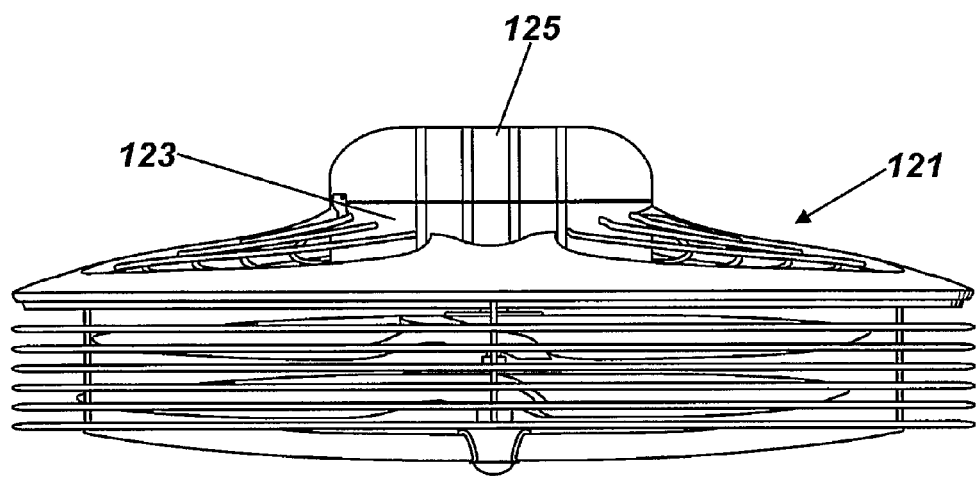
FIG. 11 is a front view of the flying machine of FIGS. 9 and 10.
Figure 12:
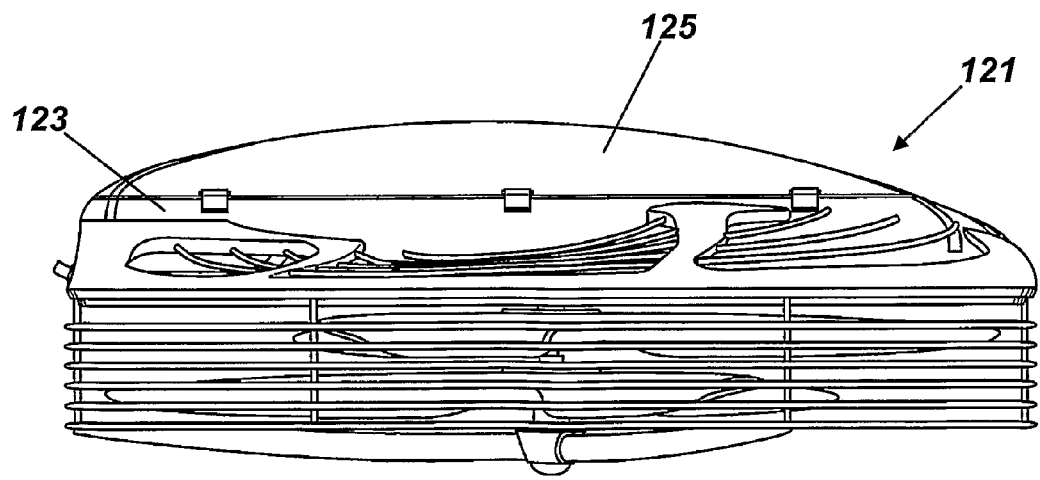
FIG. 12 is a side view of the flying machine of FIGS. 9 to 11.
Figure 13:
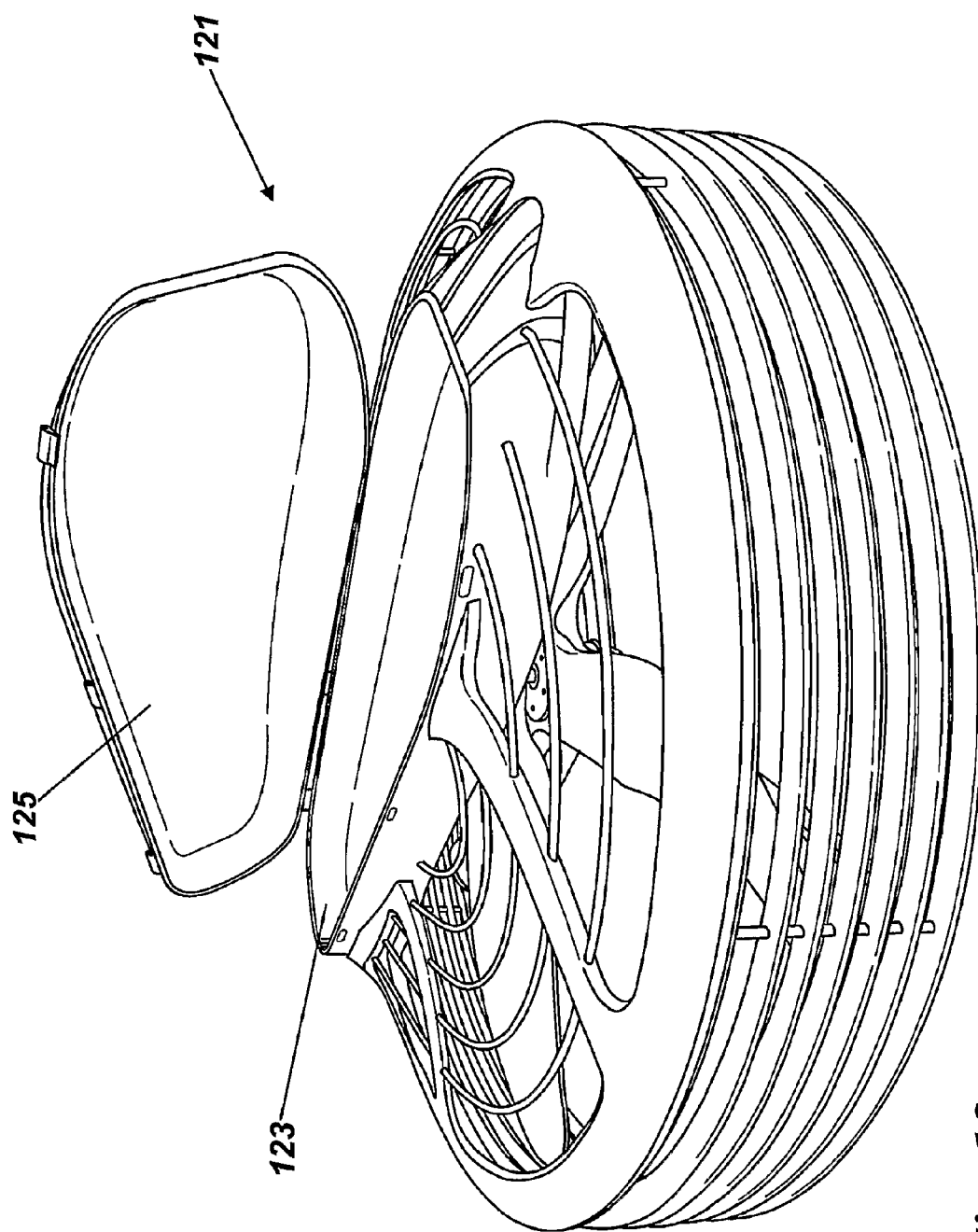
FIG. 13 is a perspective view from the front and side of the flying machine of FIGS. 9 to 12, with part of the machine in an open condition.
Figure 14:
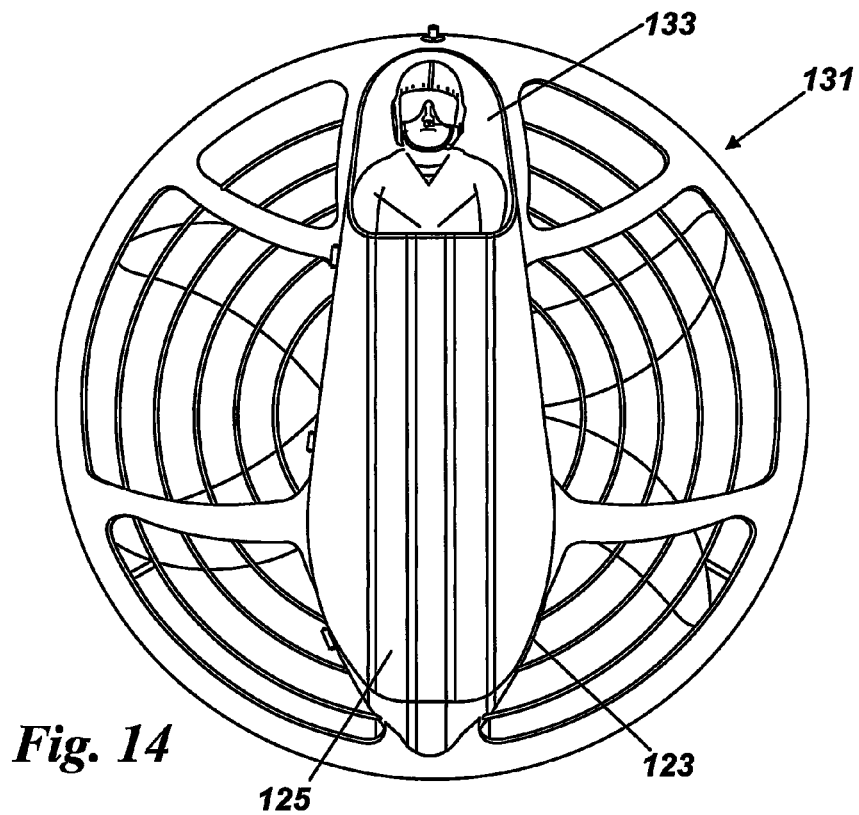
FIG. 14 is a plan view of a further embodiment of a flying machine in accordance with the present invention.
Figure 15:
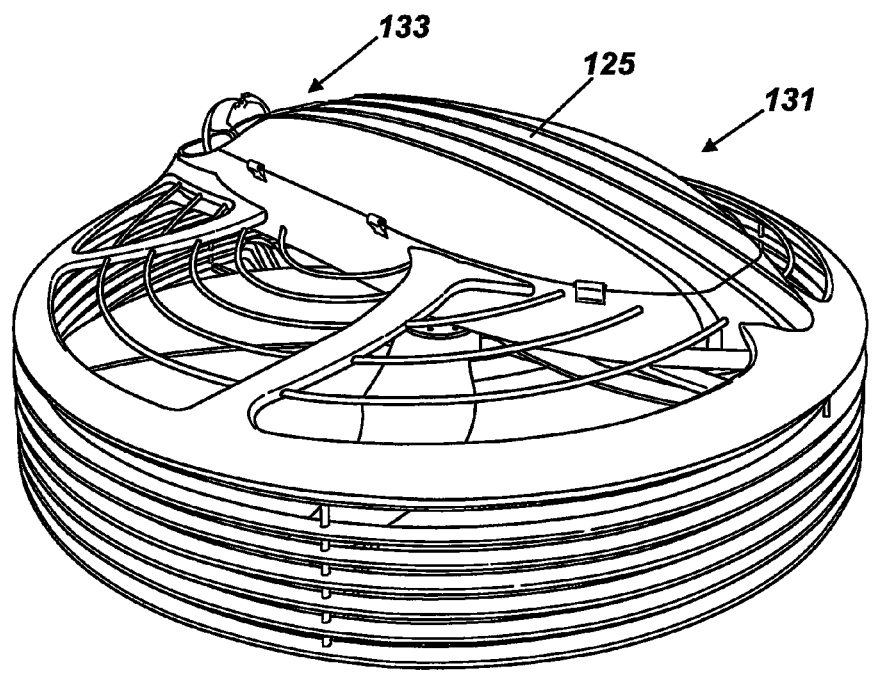
FIG. 15 is a perspective view from the front and one side of the flying machine of FIG. 14.
Figure 16:
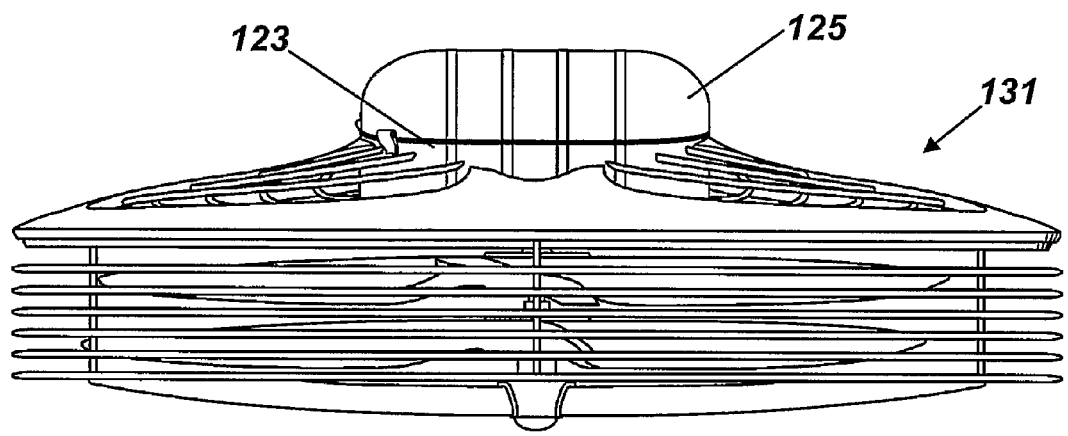
FIG. 16 is a front view of the flying machine of FIGS. 14 and 15.
Figure 17:
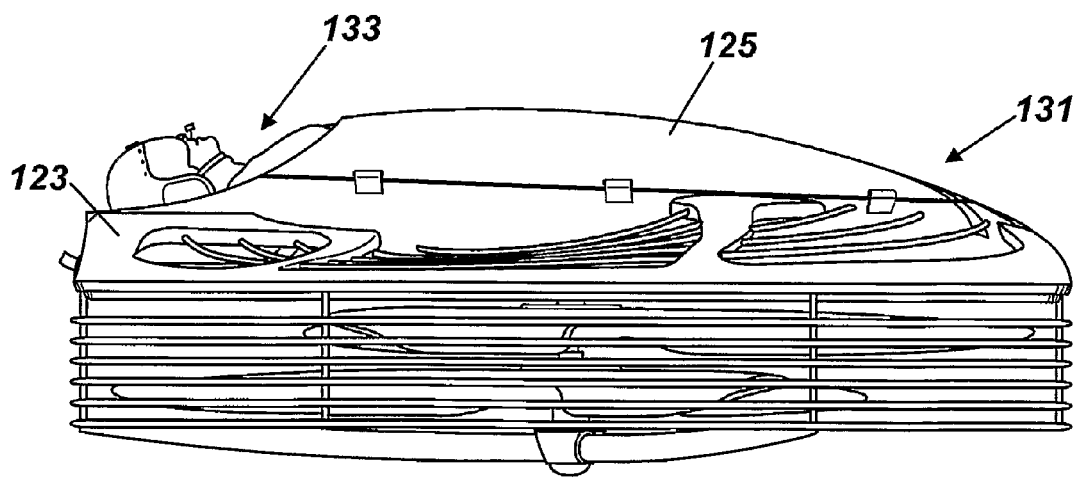
FIG. 17 is a side view of the flying machine of FIGS. 14 to 16.

FIGS. 7 and 8 illustrate two examples of a collective pitch mechanism to collectively control the pitch of the blades 5A, 7A of each propeller 5, 7.

Referring to FIG. 7, a collective pitch mechanism 81 is shown in which the pitch of the blades 5A, 7A of the upper and lower propellers 5, 7 is simultaneously controlled via a single actuator.

The collective pitch mechanism 81 comprises a non rotating control shaft 83 that passes coaxially through the centre of the inner propeller shaft 49, the upper end of the control shaft 83 projecting from the top of the gearbox housing 45, the lower end of the control shaft 83 projecting below the hub 73 of the lowermost propeller 7.

The upper end of the control shaft 83 is connected to an actuator 85 which in this example comprises a linear servo actuator. The actuator 85 is controlled by a twist grip control 86 on one end of the handlebars 21.

A lower swash plate 87 is rotatably mounted on the lower end of the control shaft 83. The lower swash plate 87 is connected to the lower mounting plate 71 of each pair of plates 71 via a respective linkage 89 at a position spaced from the longitudinal axis of the blade 7A in question. The linkages 89 transfer the rotary motion of the lower propeller 7 to the lower swash plate 87 such that the lower swash plate 87 is rotatably driven by the lower propeller 7 relative to the control shaft 83.

The upper mounting plate 71 of each blade 7A is connected to a transfer swash plate 91 via a respective transfer linkage 93. The transfer swash plate 91 is also rotatably driven with the inner propeller shaft 49 and is mounted on a sleeve 94 arranged to slide axially up and down the inner propeller shaft 49.

The sleeve 94 connects the transfer swash plate 91 to an upper swash plate 97 that is connected via linkages 99 to the lower mount plates 51 of the each part of plates 51 of the upper propeller 5. The upper swash plate 97 is rotatably mounted on the sleeve 94 as to rotate with the upper propeller 5—ie so as to rotate in the opposite direction to the lower propeller 7 and lower and transfer swash plates 87, 91.

In use, the user activates the actuator 85 by twisting the twist grip 86 on the handlebars 21. This causes the control shaft 83 to move upwardly relative to the gearbox housing 45 and propellers 5, 7. This urges the lower swash plate 87 upwardly, this linear upward movement being transferred by the linkages 89 into a clockwise rotation of the blades 7A about their longitudinal axes 77.

The upward movement of the lower swash plate 87 is transferred to the transfer swash plate 91 via the transfer linkages 93 such that the transfer swash plate 91 and sleeve 94 are also urged upwardly along the inner propeller shaft 49. The sleeve 94 imparts this vertical upward movement to the upper swash plate 97 which is rotating with the upper propeller 5. Upward linear movement of the upper swash plate 97 relative to the upper propeller 5 is transferred by the linkages 99 into an anticlockwise rotation of the blades 5A about their longitudinal axes 57.

Thus by twisting the handlebar twist grip 86 the collective pitch of the blades 5A, 7A of the upper and lower propellers 5, 7 is simultaneously altered about the longitudinal axes of the blades 5A, 7A, in a direction that accounts for the contra-rotation of the propellers 5, 7—ie with the lower blades 7A rotating clockwise, and the upper blades 5A rotating anti-clockwise. The twist grip 86 thus functions as a collective pitch control that, in use, controls the ascent or descent of the machine 1.

In this embodiment, the pitch of the propeller blades 5A, 7A is not used to control the yaw of the machine 1. Instead, a characteristic of the tail rotor 19 such as the pitch of the blades, or the speed of rotation, is used to control yaw. Control is effected by turning the handlebars 21 relative to the chassis 3 in the direction that machine yaw is required. Turning of the handlebars 21 activates an actuator that adjusts the blade pitch or speed of rotation of the tail rotor 19 accordingly.

Referring to FIG. 8, an alternative collective pitch mechanism 101 is shown in which the pitch of the blades 5A, 7A of the upper and lower propellers 5, 7 is controlled independently. The alternative collective pitch mechanism 101 functions as a yaw control mechanism.

This mechanism 101 is similar to the mechanism 91 except that the transfer and upper swash plates 91, 97 are omitted. The lower swash plate 87 remains and controls the collective pitch of the blades 7A of the lower propeller 7 as described above The collective pitch of the upper propeller blades 5A is controlled in this example by a yaw swash plate 103 that is connected to the upper mounting plates 51 of the blades 5A of upper propeller 5 via respective linkages 105. The yaw swash plate 103 is rotatably mounted on a sleeve 107 arranged to slide axially up and down the outer propeller shaft 47. The top of the sleeve 107 is connected to a linear servo actuator 109 mounted in a lower portion 111 of the gear box housing 45.

The actuator 109 is operative to move the sleeve 107 slidingly up or down the outer propeller shaft 47 so as to move the yaw swash plate 103 towards or away from the upper propeller 5. The linear movement of the yaw swash plate 103 relative to the upper propeller 5 is transferred by the linkages 105 into rotation of the upper propeller blades 5A anticlockwise about their longitudinal axes 57.

The lower and yaw swash plates 87, 103, and their associated actuators 85, 109 enable the collective pitch of the blades 5A, 7A of the upper and lower propellers 5, 7 to be adjusted independently.

By adjusting the collective pitch of the upper propeller blades 7A simultaneously with the collective pitch of the lower propeller blades 5A, the ascent and descent of the machine 1 can be controlled as described above.

However, by adjusting the collective pitch of the upper propeller blades 5A independently of the collective pitch of the lower propeller blades 7A, the torque reaction produced by the contra rotating propellers 5, 7 can be varied and thus the yaw of the machine 1 can be controlled.

In this embodiment when controlling machine yaw, the pitch of the lower propeller blades 7A is kept constant, the degree of yaw being controlled by varying the collective pitch of the upper propeller blades 5A only.

The actuator 109 controlling the pitch of the upper propeller blades 5A is activated by the twist grip 86 on the handlebars 21, and by rotation of the handlebars 21 themselves. The actuator 85 controlling the pitch of the lower propeller blades 5A is activated only by the twist grip 86 on the handlebars 21.

Thus, if the user wishes to ascend, he twists the twist grip 86 which activates both actuators 85, 109 to alter the collective pitch of the upper and lower propeller blades 5A, 7A simultaneously.

If the user wishes the machine 1 to yaw in one direction, he maintains the twist grip 86 at a constant position, and turns the handlebars 21 in the desired direction. This activates only the upper actuator 109 to increase the pitch of the upper propeller blades 5A and thus increase the torque reaction in a given direction such that the machine 1 yaws clockwise. If the handlebars 21 are turned in the opposite direction this activates the upper actuator 109 to reduce the pitch of the upper propeller blades 5A and thus decrease the torque reaction resulting in the machine 1 yawing anticlockwise. If the handlebars 21 are maintained in a straight ahead position, the actuators 85, 109 are operative such that the collective pitch of the upper and lower propeller blades 5A, 7A are identical such that there is no torque reaction and consequently no yawing of the machine 1.

In this embodiment the tail rotor 19 is not required and may be omitted.

In each of the above embodiments, some additional control of the machine's ascent or descent is provided by increasing or decreasing the speed of the motors 9 using the throttle levers.

Directional control of the machine 1 is achieved via kinaesthetics—ie by adjustment of the weight distribution of the user relative to the machine 1. To move the machine 1 forward, the user leans forward, to move the machine 1 backwards, the user leans back. The user can also steer the machine 1 in flight by leaning to one side or the other, this control typically being in conjunction with controlling the yaw of the machine 1 using the handlebars 21.

When flying in a given direction air flows through the ducts in the skirt 25 over the aerofoil shaped rings 27. This streamlines the air flow onto the propellers 5, 7 and generates lift which increases the speed and efficiency of the machine 1.

The pitch of the upper and lower propeller blades 5A, 7A is slightly different to account for the fact that the lower propeller 7 is subject, in use, to faster moving air.

When on the ground, the machine 1 may be moved around by wheeling the machine using the central ball 33. The ball 33 could be formed from a low friction material so as to slide over the ground, or could be rotatably mounted within a socket at the base of the machine 1 to enable multidirectional movement of the machine 1.

The hub in the form of the ball 33 and rear runner 32 are arranged such that at rest, the machine 1 is in an inclined orientation so as to be tilted rearwardly to assist take off by enabling the user to adjust their weight such that the rear runner 32 is lifted off the ground before the entire machine 1. This provides the user with feedback as to the correct weight distribution prior to the machine 1 taking off. The central ball 33 is mounted lower than or proud of the peripheral skirt 25. During pre-lift-off operation, using for example, 60% thrust from the propellers 5, 7, the pilot will learn to balance on this central ball 33 with no part of the peripheral skirt 25 in contact with the ground. When total balance has been achieved, that is when the machine 1 is in a non-inclined orientation with the machine 1 being supported by the central ball 33 and the lift from the propellers 5, 7, the collective pitch can then be increased to initiate take-off.

It is envisaged that the bodywork 11 could be formed from carbon fibre, with the skirt 25, rings 27 and chassis 3 formed from an aluminium material. The skirt 25 could be about 0.25 m deep and 2 m diameter. It will be appreciated that any other suitable materials and dimensions could alternatively be used.

A harness can be provided to enable the user to secure himself to the machine 1. A parachute mechanism can also be provided and may, for example, be stowed in the nose piece 13 of the machine 1 so as to be mounted just in front of the handlebars 21.

Control of the actuators 85, 109, and indeed the motor speed and tail rotor 19 blade pitch/speed, can be achieved by fly by wire electronics such that no direct mechanical connection is required between the handlebars 21, twist grips 86, the throttle control levers and the moving parts of the machine 1.

The motors 9 in the described examples are IC engines, but could instead comprise any other suitable motive power source such as an electric or hydrogen powered motor for example. Where IC engines are used, these could be two or four stroke as desired, may incorporate a forced induction system such as a supercharger or turbocharger, and may be adapted to run on petrol, diesel or biofuel.

It is envisaged that other means of controlling the yaw of the machine 1 could additionally or alternatively be provided by adjusting the relative rotational speed of one or other propeller 5, 7. This could be achieved, for example, by way of a disc brake on the upper propeller 7.

Referring additionally to FIGS. 9 to 13, another embodiment of a flying machine 121 again comprises a chassis on the underside of which are mounted two vertical axis contra-rotating propellers 5, 7, which share a common rotational axis and which are driven by two motors through a common drive mechanism, the motors being mounted on the chassis above the propellers 5, 7 and being longitudinally spaced apart along the chassis.

However, in this embodiment, the bodywork mounted on top of the chassis above the propellers 5, 7 comprises a load carrying container 123 closable by way of hinged or removable lid 125.

The load carrying container is elongate having a longitudinal axis aligned with the longitudinal axis of the machine, the container 123 being of a length that extends along the greater portion of the length of the machine, but being of relatively narrow width so that the sides of the container 123 are distal from the side margins of the machine.

Referring to FIGS. 14 to 17 a further embodiment of a flying machine 131 has similar features to the machine 121 described above with reference to FIGS. 9 to 12. However, the load carrying container 123 is modified to be able to carry a human being. The lid 125 of the container is thus provided with a cut-out 133 at one end to enable at least the head of the human being to be exposed. The cut out may be covered with a vented transparent cover (not shown).

In the embodiments 121, 131, the tail rotor is omitted and the yaw of the flying machines 121, 131 is controlled by varying the turning effect generated by each propeller 5, 7.

Furthermore it is envisaged that the flight of the flying machines 121, 131 are controlled remotely using a suitable radio or GPS based controller.

Figure 18:
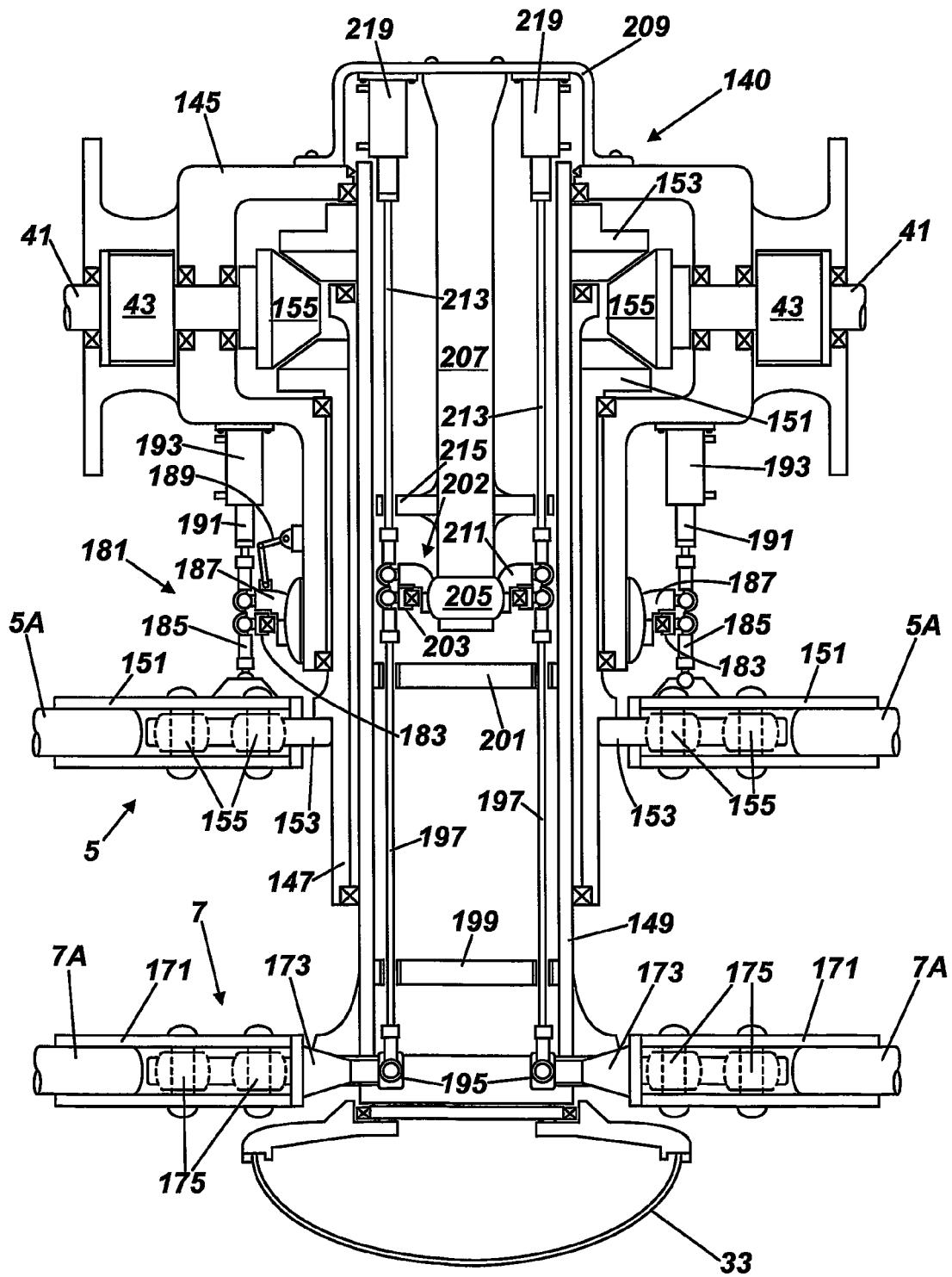
FIG. 18 is a sectional side view of a further collective pitch mechanism for use with a flying machine in accordance with the present invention.

Referring to FIG. 18, a modified pitch control mechanism 140 enables independent control of the collective and cyclic pitch of each set of rotor blades 5A, 7A via independent servos.

As with the examples described in FIGS. 7 and 8 above, each motor 9 comprises a respective output shaft 41 (which may be the output shaft of an intermediate gearbox (not shown) connected to a respective sprag or other one-way clutch 43. The output shaft 44 of each sprag clutch 43 is input to a common modified drive mechanism.

The drive mechanism comprises an upper gearbox housing 145 in which is mounted two vertical coaxial propeller shafts 147, 149, the outer shaft 147 containing the majority of the inner shaft 149. The upper end of each propeller shaft 147, 149 is provided with a respective 45° spiral bevel gear 151, 153. The lower ends of the propeller shafts 47, 49 are connected to the upper and lower propellers 5, 7 respectively.

The bevel gears 151, 153 are vertically spaced apart and are driven by smaller bevel gears 155 mounted on the ends of the sprag clutch output shafts 44 within the gearbox housing 145. The smaller bevel gears 155 are intermediate the two bevel gears 151. 153 such that the lower bevel gear 151 is driven by rotation of the sprag clutch output shafts 44 so as to rotate the outer propeller shaft 147, and upper propeller 5, in a first direction. The upper bevel gear 153 is driven by rotation of the sprag clutch output shafts 44 so as to rotate the inner propeller shaft 149, and lower propeller 7, in a direction opposite to that of the upper propeller 5.

The radially innermost end of each blade 5A of the upper propeller 5 are mounted on respective sockets 151. Each socket 151 is mounted on a hub 153 at the lower end of the outer propeller shaft 147 via two, radially spaced apart, ball and socket connectors 155.

Likewise, the radially inner end of each blade 7A of the lower propeller 7 are mounted on respective sockets 171. Each socket 171 is mounted on a hub 173 at the lower end of inner propeller shaft 149 via two, radially spaced apart, ball and socket connectors 175.

The outer shaft 147 is of relatively wide diameter and is hollow so as to contain the inner shaft 149 and a swash plate and control linkage mechanism for controlling the collective and cyclic pitch of the lower rotor blades 7A.

The outer shaft 147 is rotationally mounted inside the gearbox housing 145 via suitable bearings. The lower end of the outer shaft 147 projects from the lower part of the gearbox housing 145 and the sockets 151 are mounted on the exposed part of the outer shaft 147.

An upper rotor swash plate mechanism 181 is mounted to the outside of the lower part of the gearbox housing 145 and comprises a lower swash plate 183 that rotates with the upper propeller 5 and is connected to the socket 151 of each upper blade 5A by a linkage 185. The lower swash plate 183 engages with, and is moved up and down by, an upper swash plate 187 that is prevented from rotating by a hinge arm 189.

The upper swash plate 187 is connected, via upper link arms 191 to a pair of push/pull control servos 193 mounted to the exterior of the gearbox housing 145.

The servos 193 can be controlled to move the upper swash plate 187 up and down, this movement being transmitted to the rotating lower swash plate 183 to adjust the pitch of the blades 7A of the lower rotor 7 either collectively or cyclically.

The inner shaft 149 is rotationally mounted within the outer shaft 147 using suitable bearings/seals. The inner shaft 149 is also hollow. The lower end of the inner shaft 149 projects from the lower end of the outer shaft 147 and the lower rotor hub 173 is mounted on the projecting end of the inner shaft 149. Each socket 171 is connected to a respective pitch control arm 195 that extends through the wall of the lower part of the inner shaft 149.

Each pitch control arm 195 is connected to a respective lower control rod 197 that extends up the inside of the inner shaft 149, through two axially spaced control rod supports 199, 201 to the lower swash plate 203 of a lower rotor swash plate mechanism 202. The lower swash plate 203 is rotationally mounted on a spherical support 205 that is slidably mounted on a static swash plate support bar 207, the top of which is fixed to a gearbox housing end cap 209.

The lower swash plate 203 engages with an upper swash plate 211 non-rotationally mounted to the support bar 207.

The upper swash plate 211 is connected to upper control rods 213 that extend up the inside of the inner shaft 149, via a control rod support 215 to respective linear push/pull servos 219 that are mounted on the end cap 209.

Activation of the servos 219 thus moves the upper control rods 213 which slides the upper swash plate 211 up and down the support bar 207. The movement of the upper swash plate 211 is transferred to the lower swash plate 203. The movement is transferred from the lower swash plate 203, via the lower control rods 197 to the pitch control arms 195 to adjust the angle of each blade 7A of the lower rotor 7.

Thus the collective and cyclic pitch of the blades 5A of the upper rotor 5 can be controlled independently of the collective and cyclic pitch of the blades 7A of the lower rotor 7. The use of servos to effect this control enables the use of an electronic controller, either wired or wireless, to control the servos and thus control the pitch of the blades of the upper and lower rotors 5, 7 without a direct mechanical link to the operator of the machine.

The two sets of three (one set for the lower rotor 5 and one set for the upper rotor 7) independent servos 193, 219 and two swash plate mechanisms 181, 202 enable independent differential collective and cyclic pitch control of the rotors 5, 7.

The differential collective pitch control is desirable so that the machine will have precise yaw/heading control. By controlling the blade pitch on the lower rotor 7 differently to the blade pitch on the upper rotor 5, a torque effect is induced in one direction, causing the machine to rotate, ie causing the machine to yaw. This would be achieved by controlling the upper rotor servos 193 equally such that the swash plates 183, 187 angle remains the same but so that they move up or down along the drive shafts 147, 149. This rotates each upper blade 5A about a set angle within their sockets 151, and then controlling the lower rotor servos 219 to rotate each lower blade 7A about a different angle within their sockets 171.

The differential cyclic pitch control is achieved by controlling the upper rotor servos 193 to move unequally such that the swash plates 183, 187 are inclined relative to the drive shafts 147, 149 such that the angle of rotation of each blade 5A, 7A within it's respective socket 151, 171 is different, depending on the rotational position of that blade 5A, 7A.

Although independent control of the blades 5A, 7A is possible, it is envisaged that for standard control inputs, the swash plates 183, 187, 203, 211 will be controlled such that the upper and lower blades 5A, 7A move identically, unless the machine heading needs to be changed.

In this embodiment, the central hub 33 is rotationally mounted on the base of the inner shaft 149 and using suitable bearings comprises an air filled shock absorbing semi-spherical ball.

Referring now to FIGS. 19 to 24, the front and rear of a modified flying machine 200 is provided with elongate adjustable aerofoils 221 that replace front and rear sections of the fixed aerofoil rings 27 of the machine 1 described above. The adjustable aerofoils 221 each comprise elongate wings that are mounted on the fixed aerofoil rings 27 for rotation about respective horizontal axes that are positioned at the centre of pressure 223 of each aerofoil 221.

The front and rear sets of aerofoils 221 are each controlled by a suitable mechanical or electromechanical control mechanism. It is envisaged, for example, that the each set of aerofoils be connected to a respective control arm that is movable by actuation of a linear push/pull servo.

Figure 19:
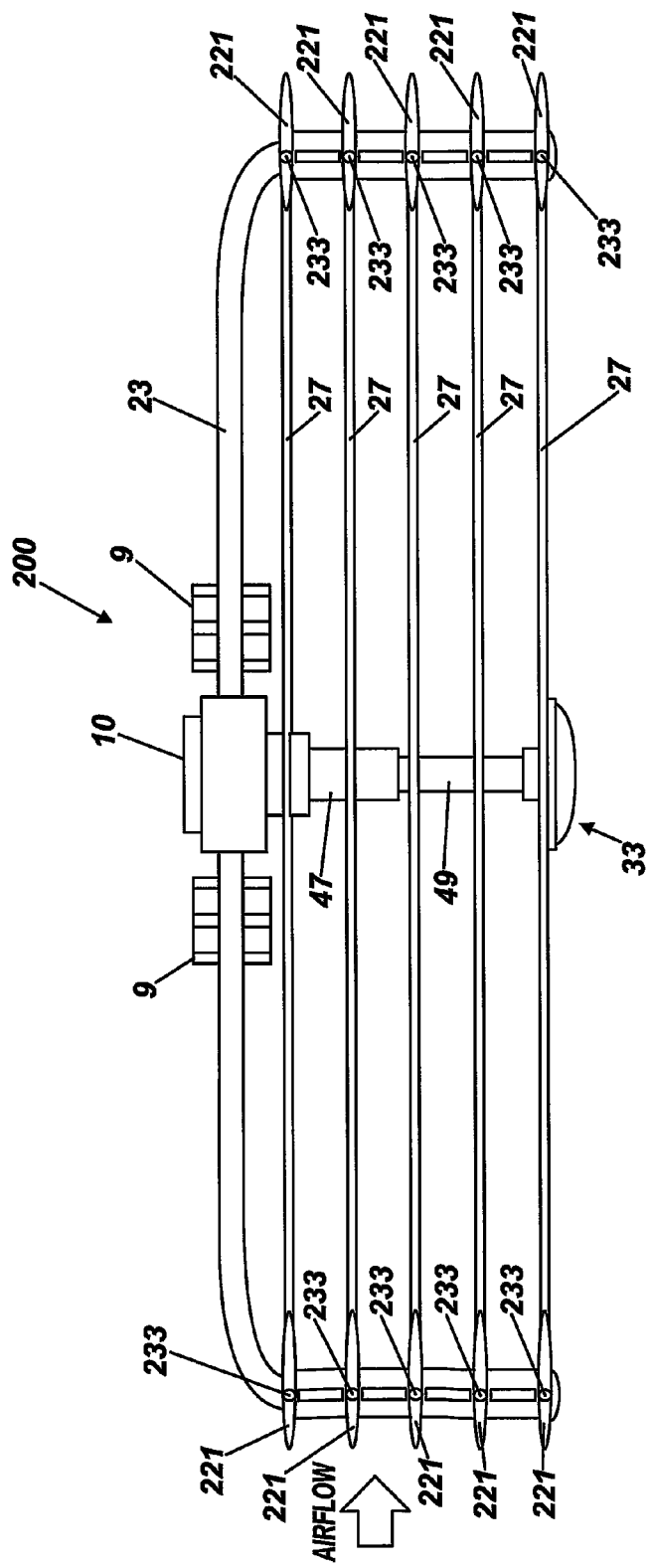
FIG. 19 is a side view of a modified flying machine in accordance with the present invention, with parts of the machine removed for clarity; and other parts of the machine in a first condition.
Figure 20:
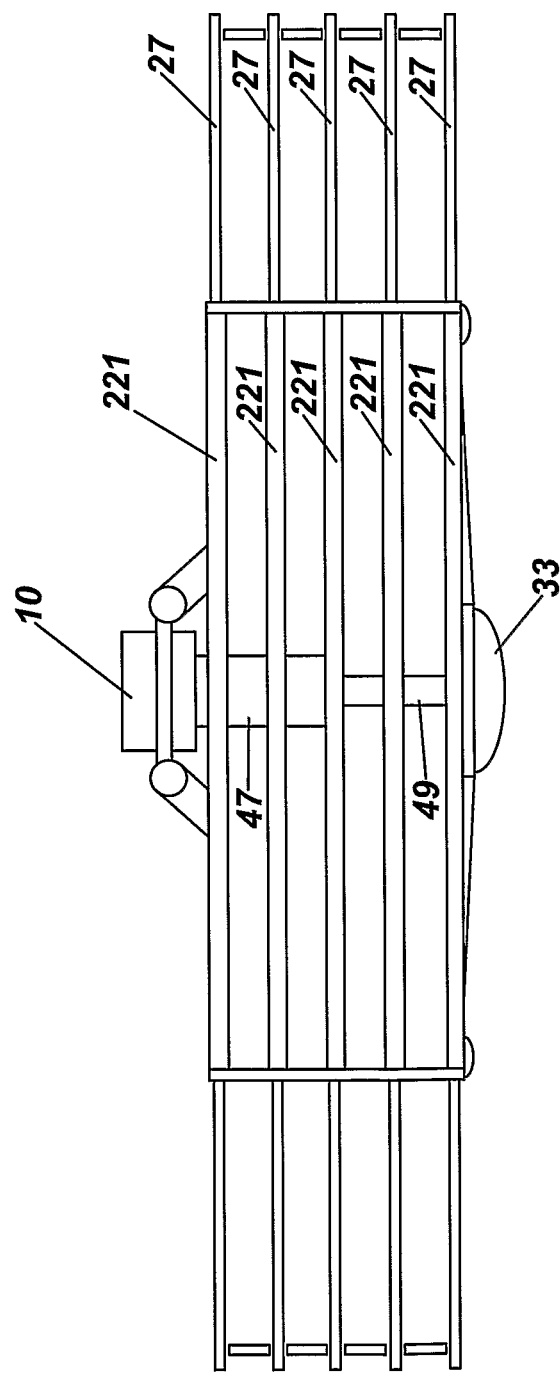
FIG. 20 is a front view of the modified flying machine of FIG. 19.
Figure 21:
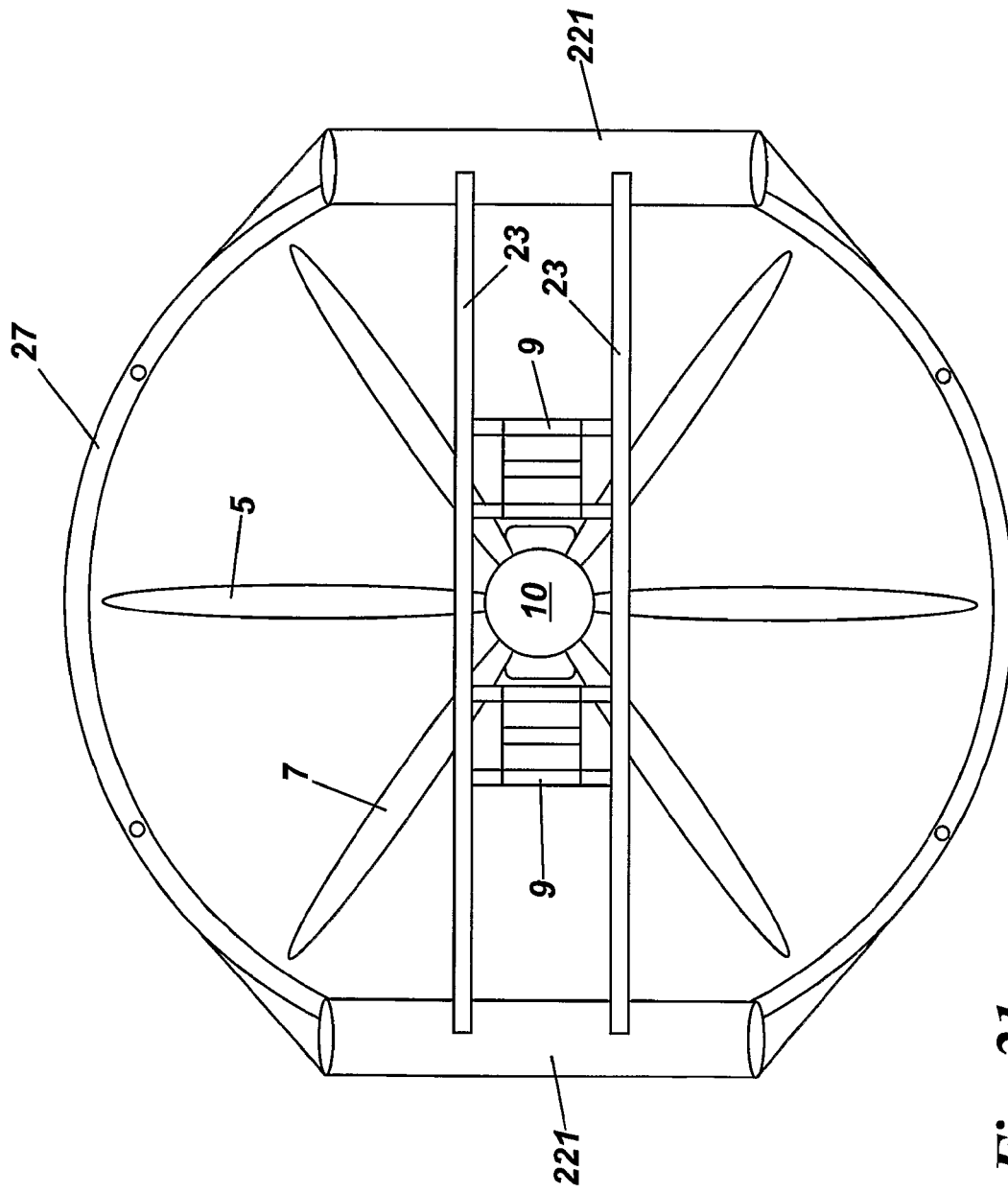
FIG. 21 is a plan view of the modified flying machine of FIGS. 19 and 20.
Figure 22:
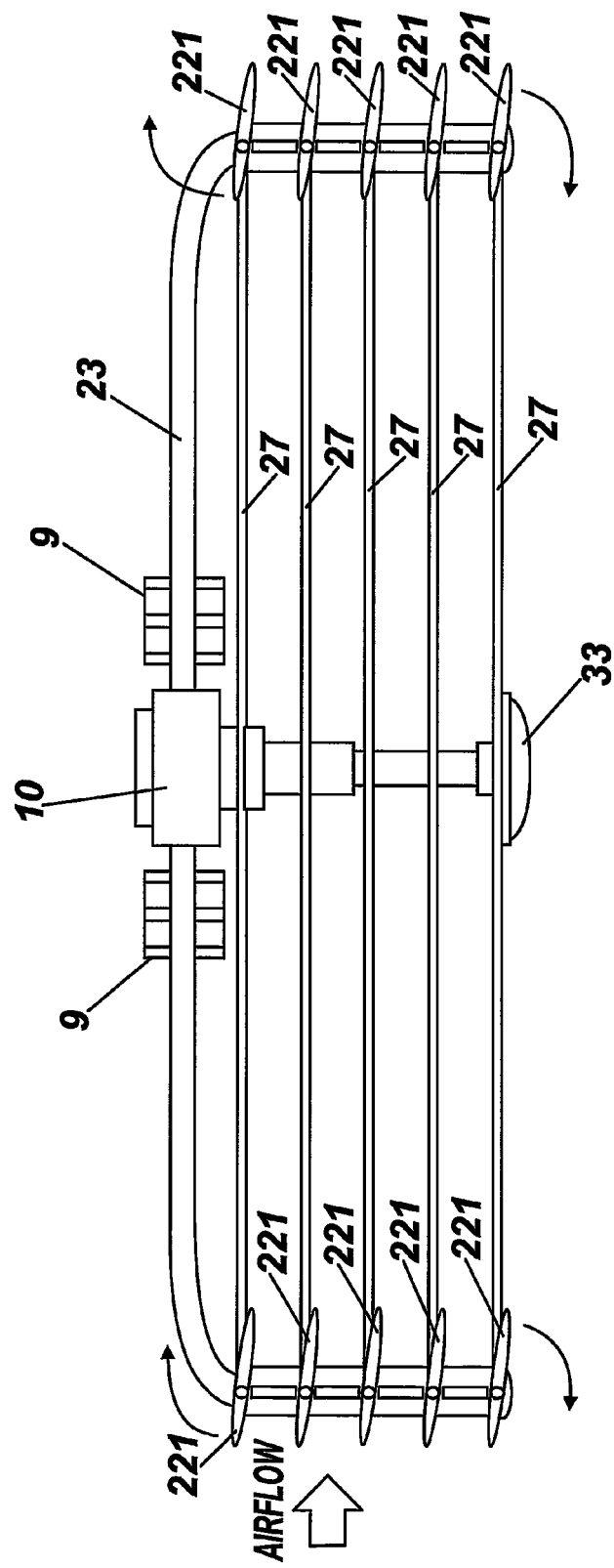
FIG. 22 is a side view of the modified flying machine of FIGS. 19 to 21 with parts of the machine in a second condition.
Figure 24:
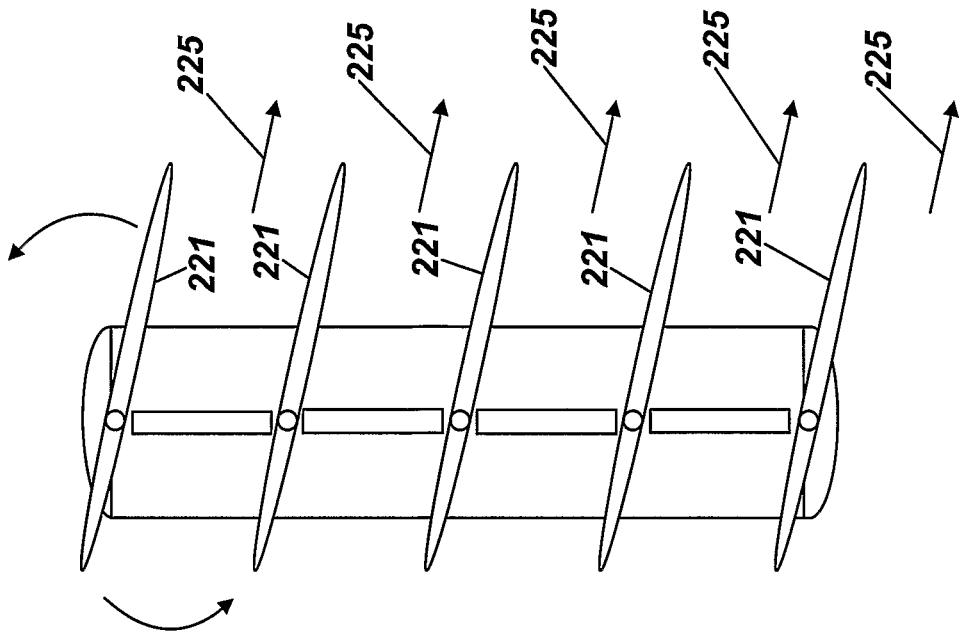
FIG. 24 is a view corresponding to FIG. 23 but with parts of the machine in a second condition.
Figure 23:
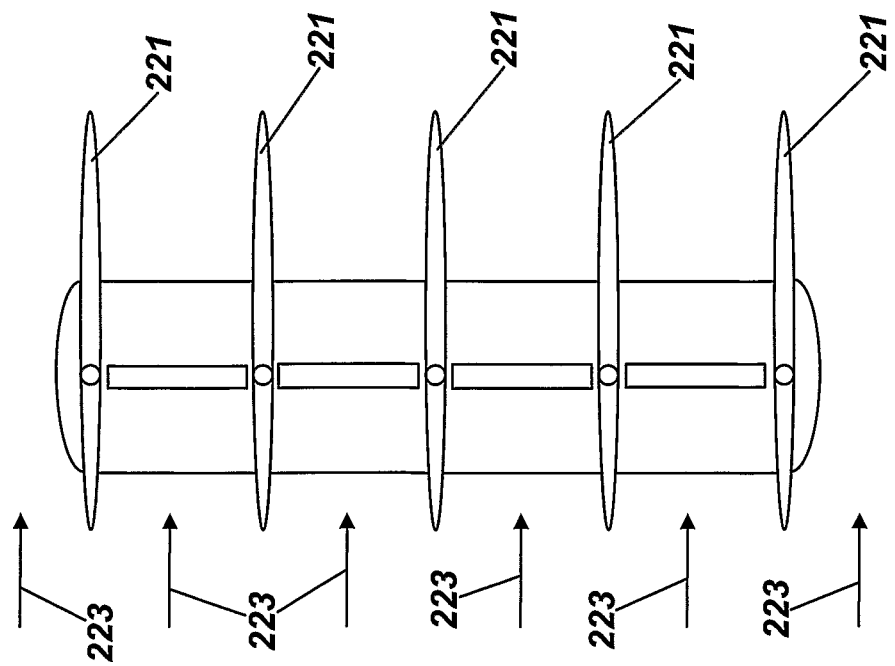
FIG. 23 is an enlarged side view of part of the modified flying machine of FIGS. 19 to 22 with parts of the machine in a first condition.
Figure 25:
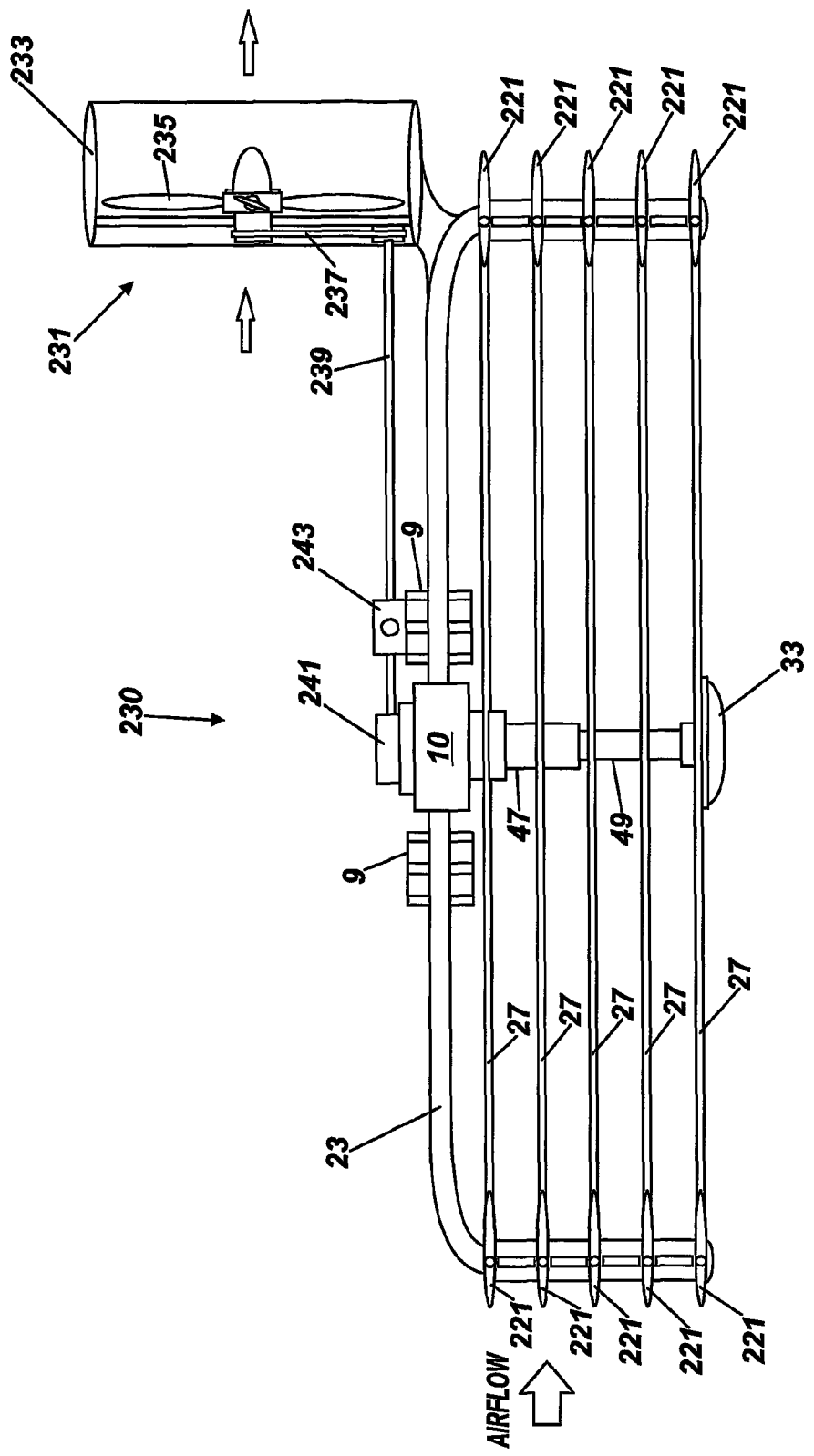
FIG. 25 is a side view of a further modified flying machine in accordance with the present invention, with parts of the machine removed for clarity; and other parts of the machine in a first condition.
Figure 26:
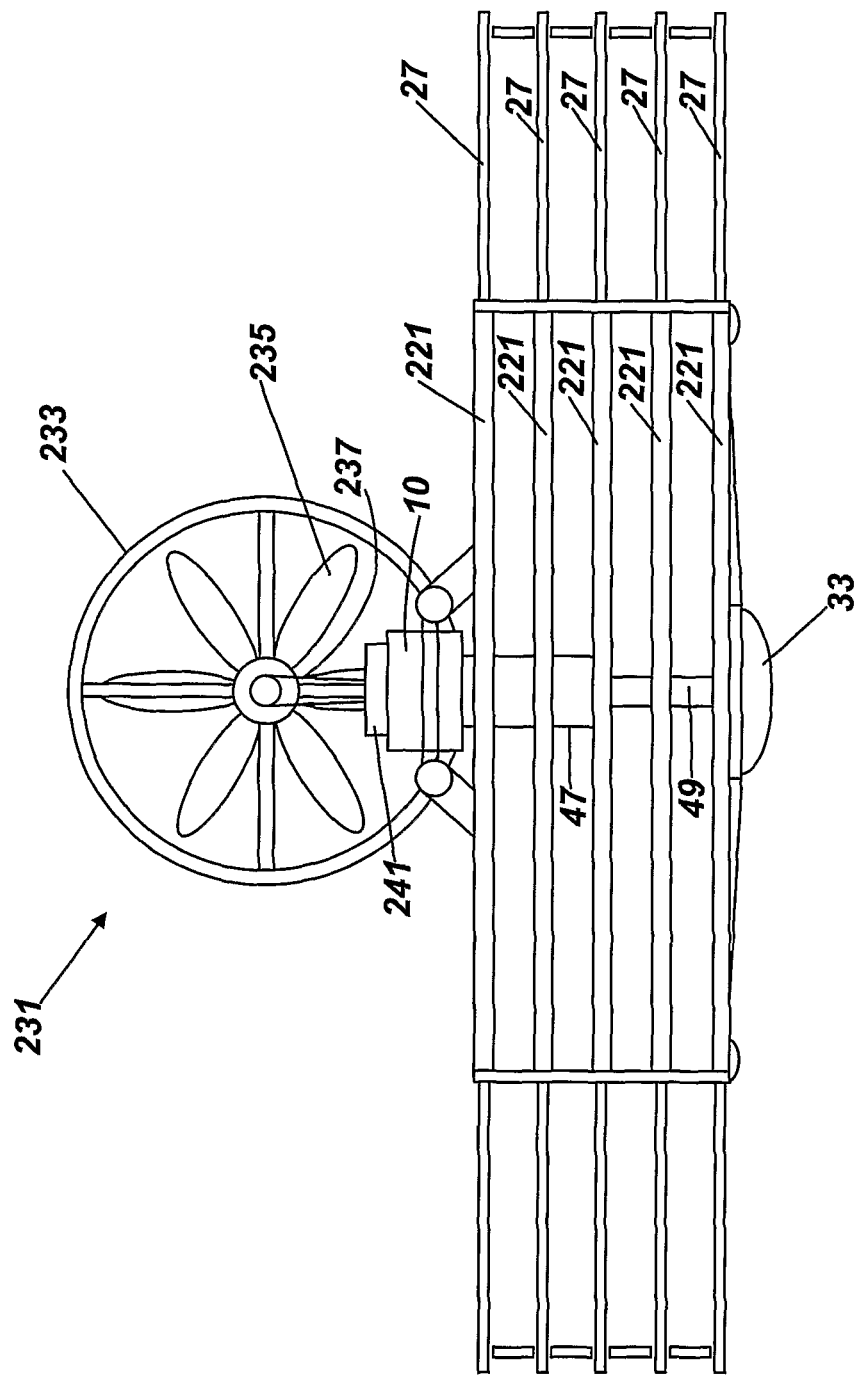
FIG. 26 is a front view of the further modified flying machine of FIG. 25.
Figure 27:
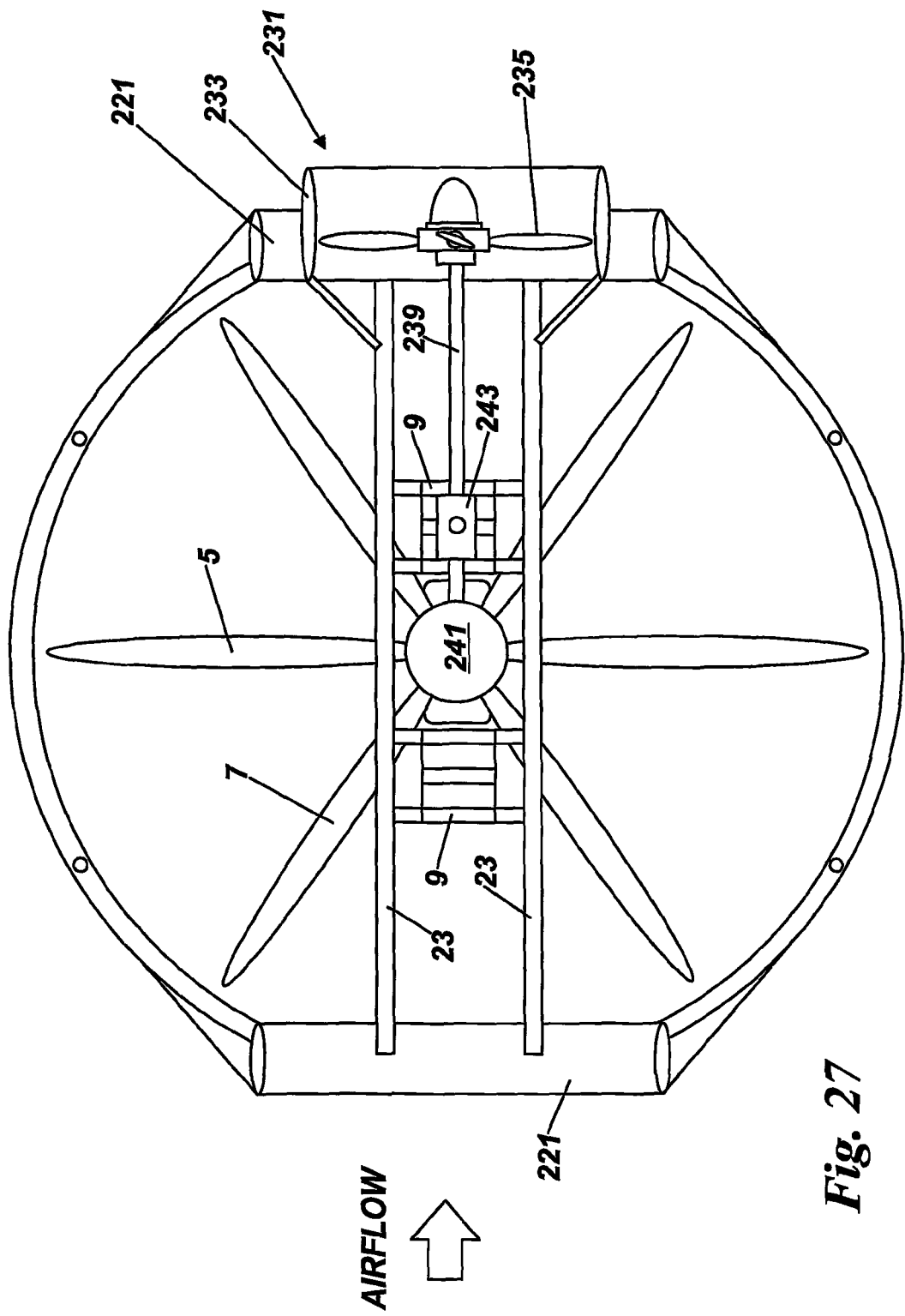
FIG. 27 is a plan view of the further modified flying machine of FIGS. 25 and 26.
Figure 28:
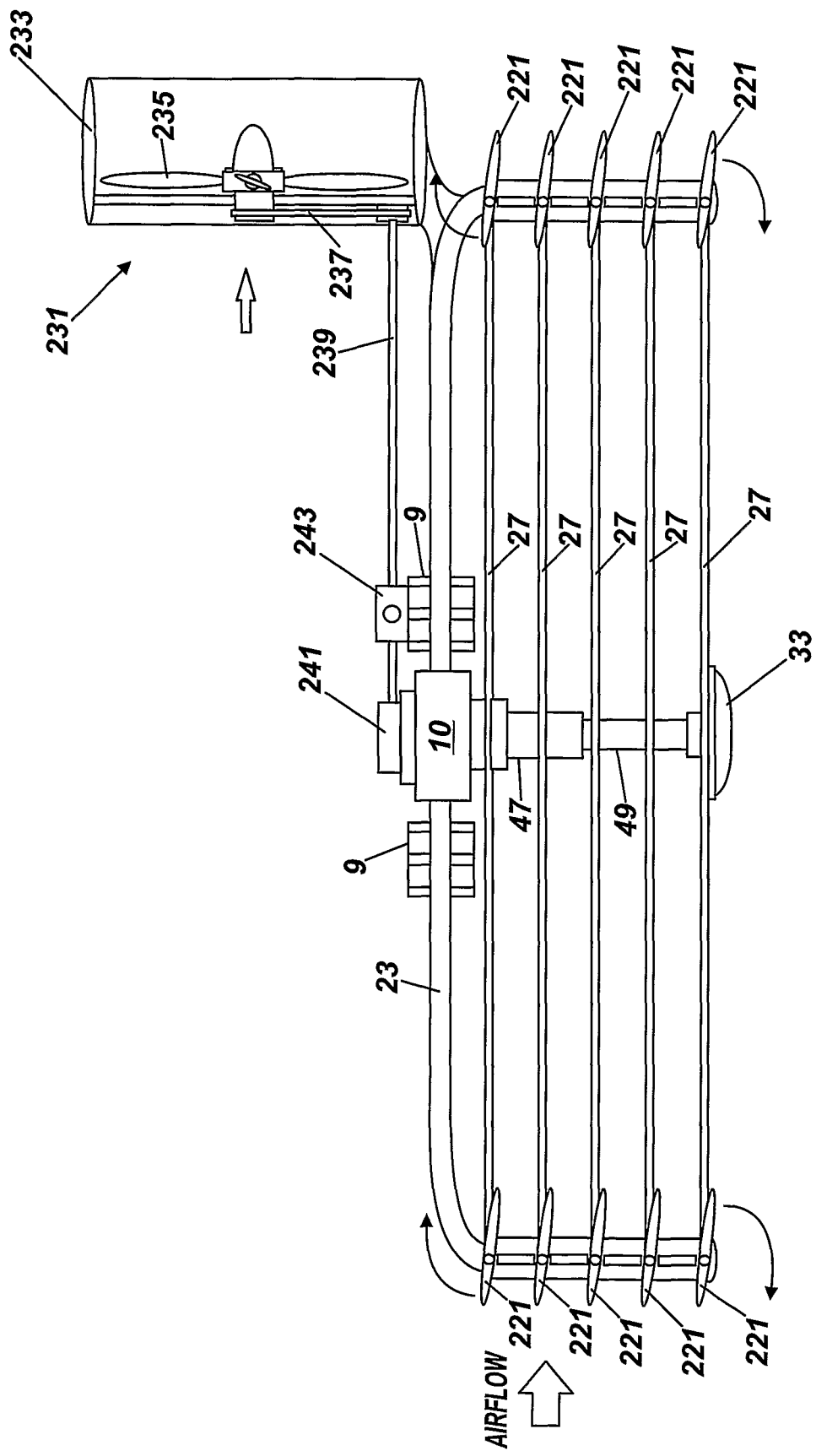
FIG. 28 is a side view of the further modified flying machine of FIGS. 25 to 27 with parts of the machine in a second condition.

Each set of aerofoils 221 is movable between a neutral position as shown with reference to FIGS. 19 and 23, and an inclined position as indicated with reference to FIGS. 22 and 24.

In the neutral position, the aerofoils 221 in the front and rear sets channel air in a direction generally indicated by arrows 223, that is, in a direction parallel with the longitudinal axis of the machine. This neutral position would be used for hovering and low speed flight.

However, when additional lift is required, as might be the case during forward flight, the aerofoils 221 in the front and rear sets are moved to the inclined position to channel air in a direction generally indicated by arrows 225, that is, in a direction inclined to the longitudinal axis of the machine.

The movable aerofoils 221 thus enable additional lift to be generated when required.

Of course, the front and rear sets of aerofoils 221 may be controlled independently so that only the front or rear set of aerofoils 221 is moved. Thus considerable fine tuning of the generated lift is possible. It is envisaged that the angle of the aerofoils 221 be controlled automatically in response to an input by the operator to the machine that more or less lift is required.

Referring now to FIGS. 25 to 28 the rear of a further modified flying machine 230 is provided with a rear pusher fan assembly 231 comprising an impeller duct 233 in which is rotatably mounted a pusher impeller 235, the rotational axis of which is parallel with the longitudinal axis of the machine, that is, perpendicular to the axis of the rotation of the rotors 5, 7.

The pusher impeller 235 is driven, via an impeller transmission 237, by an impeller drive shaft 239 that extends rearwardly from an auxiliary gearbox 241 at the centre of the machine 230. The impeller transmission 237 may comprise, for example, a geared or belted link between the impeller 235 and the drive shaft 237. A clutch 243 is provided between the auxiliary gearbox 241 and the drive shaft 239. The auxiliary gearbox 241 is driven from the main gearbox 10 of the machine 230.

The pusher fan assembly 231 is used to generate additional forward thrust when required. This may be simply when additional forward speed is required, or may be to assist in other manoeuvres such as a rapid gain in altitude, or change of direction.

The pusher fan assembly 231 may be controlled in conjunction with the movable aerofoils 221, and may be controlled automatically, so that the combination of the impellers 5, 7, the aerofoils 221 and the pusher fan assembly 231 are arranged to deliver the required combination of forward thrust, lift and direction.

It is envisaged that any of the features described above may be combined as required, and are not therefore limited only to the particular embodiments described. For example the pusher fan assembly may be provided on a machine not having movable aerofoils.

It is envisaged that the machine described above may be provide with a plurality of seats, spaced apart transversely across, or longitudinally along, the machine.

The propellers 5, 7 speed and blade pitch, the servos 193, 219, the movable aerofoils 221, and the pusher fan assembly 231 if provided, may be controlled mechanically or electrically by a suitable wired or wireless controller.

The flying machines described above may be controlled autonomously, that is, without requiring a pilot on the machine itself. Autonomous control can be achieved by the use of gyros mounted on the machine to detect movement of the machine in a given direction and to send a signal to the controller to vary at least one of the propellers 5, 7 speed and blade pitch, the servos 193, 219, the movable aerofoils 221, and the pusher fan assembly 231 so as to generate a force that counters the movement detected.

A plurality of piezo electronic gyros are incorporated into the controller that controls the aircraft flight control servos. Each gyro, and in turn each servo, holds the aircraft in a specific predetermined attitude in yaw, pitch and roll unless otherwise commanded by the pilot or the controller. The gyro stabilisation system prevents air turbulence or aircraft weight distribution from affecting the attitude of the aircraft in flight. It also allows the aircraft to be flown by pilots with very low skill level because the aircraft is to some extent controlling its own attitude independently, that is, without relying on pilot input. So the controller could be set up such that if the pilot is to release control of the machine entirely, it will settle to a neutral position such as a static hovering position.

A plurality of accelerometers can also be incorporated into the controller that controls the flight control servos. Each accelerometer measures motion in altitude, side slip and fore and aft motion. Again this allows the aircraft to be controlled by the controller to maintain a static position in the hover even in severe wind, and prevents the aircraft from being brought into land too fast.

All parameters of the gyros and the accelerometers are pre-programmed into the controller to suit the pilot level or the appropriate autonomous control requirements. Different programs may be used for different pilots or uses.

The gyro control system thus can maintain stability in three dimensions.

The controller is effectively controlling at least one of the propellers 5, 7 speed and blade pitch, the servos 193, 219, the movable aerofoils 221, and the pusher fan assembly 231 to move the machine to catch up with the direction in which the machine is sensed by the gyros to be falling, thus shifting the centre of gravity back under the machine.

It is envisaged that the cyclic pitch of both the upper and lower rotors 5, 7 is altered at intervals of for example 0.06 seconds if required. For example if a gust of wind blows the aircraft slightly over the right, a gyro will sense this and send a signal to the controller for the cyclic pitch control to increase the pitch of the blades as they approach the right hand side of the aircraft, thus increasing the lift in that side of the aircraft only and re-levelling it. It is envisaged that thousands of signals are sent every minute from the controller to the servos to adjust the blade pitch and therefore keep the aircraft in perfect trim at all times. The accelerometers work in the same way except that they are used by the controller to control the aircraft to hold a position in relation to where it was last sensed to be rather than to hold a particular attitude.

In another alternative embodiment of the flying machine, the cyclic and collective pitch of the blades 5A of the upper rotor 5 can be controlled with the cyclic and collective pitch of the blades 7A of the lower rotor 7 using only three servos. The pitch of the upper set of blades 5A is thus controlled non-independently of the pitch of the lower set of blades 7A. When so arranged, the yaw of the machine may be controlled by an airflow adjustment mechanism comprising means to adjust the airflow into and/or out of the propellers 5, 7.

Such a mechanism may comprise two sets of two adjustable vanes, both sets being mounted above the propellers 5, 7, one set towards the front of the machine, the other set being towards the back of the machine. Both sets are mounted such that there is a vane of each set on each side of the longitudinal axis of the machine. Each vane is mounted for movement about a generally horizontal axis so as to be able to adjust the direction of some of the airflow through the propellers 5, 7. The air flow can thus be adjusted by the vanes either side of the longitudinal axis of the machine to cause the aircraft to spin right or left.

The airflow adjustment means could comprise any means to change the direction of airflow, including vanes in the form of aerofoils, flaps or variable opening ducts.

The airflow adjustment means could be located in any suitable position relative to the propellers 5, 7. Such positions include, for example, above the top propeller 5, below the lower propeller 7, or in between the propellers 5, 7.

The invention claimed is:

1. A flying machine comprising: a chassis; at least one motor; two vertical axis contra-rotating propellers having blades arranged with a pitch to generate lift on rotation of the propellers by the motor, the motor being above the propellers, and the propellers sharing a common rotational axis and having an outer periphery; a seat, footrests and handlebars each mounted above the propellers at positions radially inward of the outer periphery of the propellers, the handlebars being mounted on the chassis, the footrests being provided adjacent the seat, the seat, handlebars and footrests being arranged such that a user of the machine sits substantially centrally on top of the propellers; and a peripheral skirt which surrounds the propellers, the skirt having inlet ducts therein which are arranged to supply air to the propellers in use;

wherein the skirt is circular and comprises a plurality of vertical spaced rings held in spaced apart position by a plurality of spacer struts and wherein the ducts in the skirt are defined between the rings;

wherein the rings of the skirt are spaced axially apart from each other in a direction parallel to the rotational axis, and the plurality of rings are arranged in a row extending vertically from a location adjacent a lowermost propeller to a location adjacent an uppermost propeller.

2. The machine of claim 1 wherein the propellers are arranged such that a characteristic of the propellers can be varied to account for any difference in air flow into each propeller such that in use each propeller produces substantially the same lift.

3. The machine of claim 2 wherein it is the pitch of the propeller blades that can be varied.

4. The machine of claim 1 wherein the machine comprises two motors.

5. A flying machine according to claim 1, wherein a controller is provided comprising a plurality of gyros arranged to generate signals indicative of the attitude of the machine, the controller being operative to process the signals and to subsequently control the machine to maintain the machine in a predetermined attitude.

6. The machine of claim 1 wherein the handlebars extend transversely from the longitudinal axis of the machine.

7. The machine of claim 1, wherein footrests are provided adjacent each side of the seat to protect the feet of the operator from the propellers.

8. The machine of claim 1 wherein the rings are of aerofoil shaped transverse cross section.

9. The flying machine of claim 1 comprising at least one movably mounted aerofoil, the angle of inclination of which can be adjusted relative to the machine.

10. The flying machine of claim 9 wherein the movably mounted aerofoil is mounted for rotation about a horizontal axis extending transversely across the machine.

11. The flying machine of claim 9 wherein a plurality of movable aerofoils are provided.

12. The flying machine of claim 11 wherein a first set of movable aerofoils is provided at the front of the machine and a second set at the rear of the machine.

13. The flying machine of claim 1 wherein the handlebars are operative to vary a characteristic of the contra-rotating propellers to induce a torque reaction to cause the machine to yaw.

14. The flying machine according to claim 13 wherein each propeller has a rotational speed and the handlebars control the relative rotational speed of the propellers to control the yaw of the machine.

15. The flying machine according to claim 13 wherein the blades of each propeller have a collective pitch and the handlebars vary the difference between the collective pitch of each propeller in order to induce the torque reaction.

16. The flying machine according to claim 1, wherein an uppermost one of said rings is adjacent the uppermost propeller and a lowermost one of said rings is adjacent the lowermost propeller.

17. The flying machine according to claim 1, wherein the rings of the skirt are spaced axially apart from each other in a direction parallel to the rotational axis such that an uppermost one of said ducts is adjacent an uppermost propeller and a lowermost one of said ducts is adjacent a lowermost propeller.

18. A flying machine comprising at least one motor above two vertical axis contra-rotating propellers having blades with a pitch arranged to generate lift on rotation of the propellers by the motor, the propellers sharing a common rotational axis and having an outer periphery, the machine being provided with a seat mounted on the machine above the propellers at a position radially inward of the outer periphery of the propellers such that the seat is positioned substantially centrally on top of the rotational axis of the propellers; and a peripheral skirt which surrounds the propellers, the skirt having inlet ducts therein which are arranged to supply air to the propeller in use;

wherein the skirt is circular and comprises a plurality of vertical spaced rings held in spaced apart position by a plurality of spacer struts and wherein the ducts in the skirt are defined between the rings;

wherein the rings of the skirt are spaced axially apart from each other in a direction parallel to the rotational axis, and the plurality of rings are arranged in a row extending vertically from a location adjacent a lowermost propeller to a location adjacent an uppermost propeller.

* * * * *